US012656718B2

(12) United States Patent
Matsumoto et al.

(10) Patent No.: US 12,656,718 B2
(45) Date of Patent: Jun. 16, 2026

(54) CONVEYANCE DEVICE AND IMAGE FORMING APPARATUS

(71) Applicants: Yuma Matsumoto, Kanagawa (JP); Keitaro Shoji, Kanagawa (JP); Yuusuke Furuichi, Kanagawa (JP)

(72) Inventors: Yuma Matsumoto, Kanagawa (JP); Keitaro Shoji, Kanagawa (JP); Yuusuke Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 228 days.

(21) Appl. No.: 18/301,494

(22) Filed: Apr. 17, 2023

(65) Prior Publication Data

US 2023/0367252 A1 Nov. 16, 2023

(30) Foreign Application Priority Data

May 16, 2022 (JP) ................................ 2022-080158

(51) Int. Cl.
*B65H 5/02* (2006.01)
*G03G 15/00* (2006.01)

(52) U.S. Cl.
CPC ......... *G03G 15/6529* (2013.01); *B65H 5/025* (2013.01); *B65H 2553/27* (2013.01); (Continued)

(58) Field of Classification Search
CPC .................................................. B65H 2553/27
See application file for complete search history.

(56) References Cited

U.S. PATENT DOCUMENTS

2015/0316879 A1* 11/2015 Koyama ............ G03G 15/2017 399/69
2017/0160683 A1* 6/2017 Gon .................. G03G 15/2039
(Continued)

FOREIGN PATENT DOCUMENTS

JP 2005257902 A 9/2005
JP 2006078797 A 3/2006
(Continued)

OTHER PUBLICATIONS

U.S. Appl. No. 18/060,566, filed Nov. 30, 2022, Yuusuke Furuichi, et al.
(Continued)

*Primary Examiner* — Howard J Sanders
(74) *Attorney, Agent, or Firm* — Harness, Dickey & Pierce, P.L.C.

(57) ABSTRACT

A conveyance device includes a first temperature detector and a second temperature detector that detect a temperature of a heater. A recording medium detector detects a recording medium. The first temperature detector is separated from a center position of an elastic layer of a pressure rotator farther than the second temperature detector is in an orthogonal direction perpendicular to a recording medium conveyance direction. The first temperature detector is separated from the center position for a first length and disposed in a first span defined by the center position in the orthogonal direction. The recording medium detector is disposed in a second span opposite to the first span, separated from the center position for a second length smaller than the first length, and disposed in a minimum recording medium conveyance span where the recording medium having a minimum width in the orthogonal direction is conveyed.

20 Claims, 19 Drawing Sheets

(52) U.S. Cl.
CPC .................... *B65H 2801/06* (2013.01); *G03G 2215/00666* (2013.01); *G03G 2215/00679* (2013.01); *G03G 2215/00734* (2013.01)

(56) References Cited

U.S. PATENT DOCUMENTS

| | | | |
|---|---|---|---|
| 2022/0179338 | A1 | 6/2022 | Seshita et al. |
| 2022/0283530 | A1 | 9/2022 | Adachi et al. |
| 2022/0291610 | A1 | 9/2022 | Seki et al. |
| 2022/0299919 | A1 | 9/2022 | Inoue et al. |
| 2022/0299920 | A1 | 9/2022 | Shimada et al. |
| 2022/0308511 | A1 | 9/2022 | Someya et al. |
| 2022/0357697 | A1 | 11/2022 | Furuichi |
| 2022/0382191 | A1 | 12/2022 | Furuichi et al. |
| 2022/0382192 | A1 | 12/2022 | Inoue et al. |
| 2022/0390894 | A1 | 12/2022 | Saito et al. |
| 2023/0004108 | A1 | 1/2023 | Furuichi et al. |
| 2023/0010218 | A1 | 1/2023 | Shoji et al. |
| 2023/0063779 | A1 | 3/2023 | Shimada et al. |
| 2023/0081075 | A1 | 3/2023 | Someya et al. |
| 2023/0110956 | A1 | 4/2023 | Furuichi |

FOREIGN PATENT DOCUMENTS

| | | | |
|---|---|---|---|
| JP | 2007093772 | A | 4/2007 |
| JP | 2010-026449 | | 2/2010 |
| JP | 2012-198475 | | 10/2012 |
| JP | 2017-156669 | | 9/2017 |
| JP | 2021117298 | A | 8/2021 |

OTHER PUBLICATIONS

Japanese Office Action for Japanese Application No. 2022-080158 dated Feb. 27, 2026.

* cited by examiner

CONVEYANCE DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-080158, filed on May 16, 2022, in the Japan Patent Office, the entire disclosure of which is hereby incorporated by reference herein.

BACKGROUND

Technical Field

Embodiments of this disclosure relate to a conveyance device and an image forming apparatus incorporating the conveyance device.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses include a conveyance device that conveys recording media. When a user places a recording medium onto a sheet tray for a recording medium having a minimum width that is available in an image forming apparatus, the user may place a recording medium having a width smaller than the minimum width erroneously and the image forming apparatus may form an image on the recording medium.

In this case, a rotator (e.g., a fixing belt) over which the recording medium is conveyed may suffer from overheating. For example, while the rotator fixes the image on the recording medium having the width smaller than the minimum width, the rotator has an increased non-conveyance span where the recording medium is not conveyed and does not draw heat from the rotator. The rotator suffers from overheating in the increased non-conveyance span, resulting breakage of the rotator. If the user places a recording medium having a size different from a preset size on the sheet tray, the recording medium may shift in an orthogonal direction perpendicular to a recording medium conveyance direction in which the recording medium is conveyed. To address the circumstances described above, the image forming apparatus is requested to detect failure to prevent breakage of the rotator.

SUMMARY

This specification describes below an improved conveyance device. In one embodiment, the conveyance device includes a first rotator that conveys a recording medium in a recording medium conveyance direction and a heater that heats the first rotator. A first temperature detector detects a temperature of the heater. A second temperature detector detects a temperature of the heater. A second rotator presses against the first rotator. The second rotator includes an elastic layer. A recording medium detector detects the recording medium. The first temperature detector is separated from a center position of the elastic layer of the second rotator farther than the second temperature detector is in an orthogonal direction perpendicular to the recording medium conveyance direction. The first temperature detector is separated from the center position for a first length in the orthogonal direction. The first temperature detector is disposed in a first span that is defined by the center position in the orthogonal direction. The recording medium detector is disposed in a second span that is defined by the center position in the orthogonal direction and is opposite to the first span. The recording medium detector is separated from the center position for a second length smaller than the first length in the orthogonal direction. The recording medium detector is disposed in a minimum recording medium conveyance span where the recording medium having a minimum width in the orthogonal direction is conveyed. The minimum width is available in the conveyance device.

This specification further describes an improved image forming apparatus. In one embodiment, the image forming apparatus includes an image forming device that forms an image on a recording medium and the conveyance device described above that conveys the recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
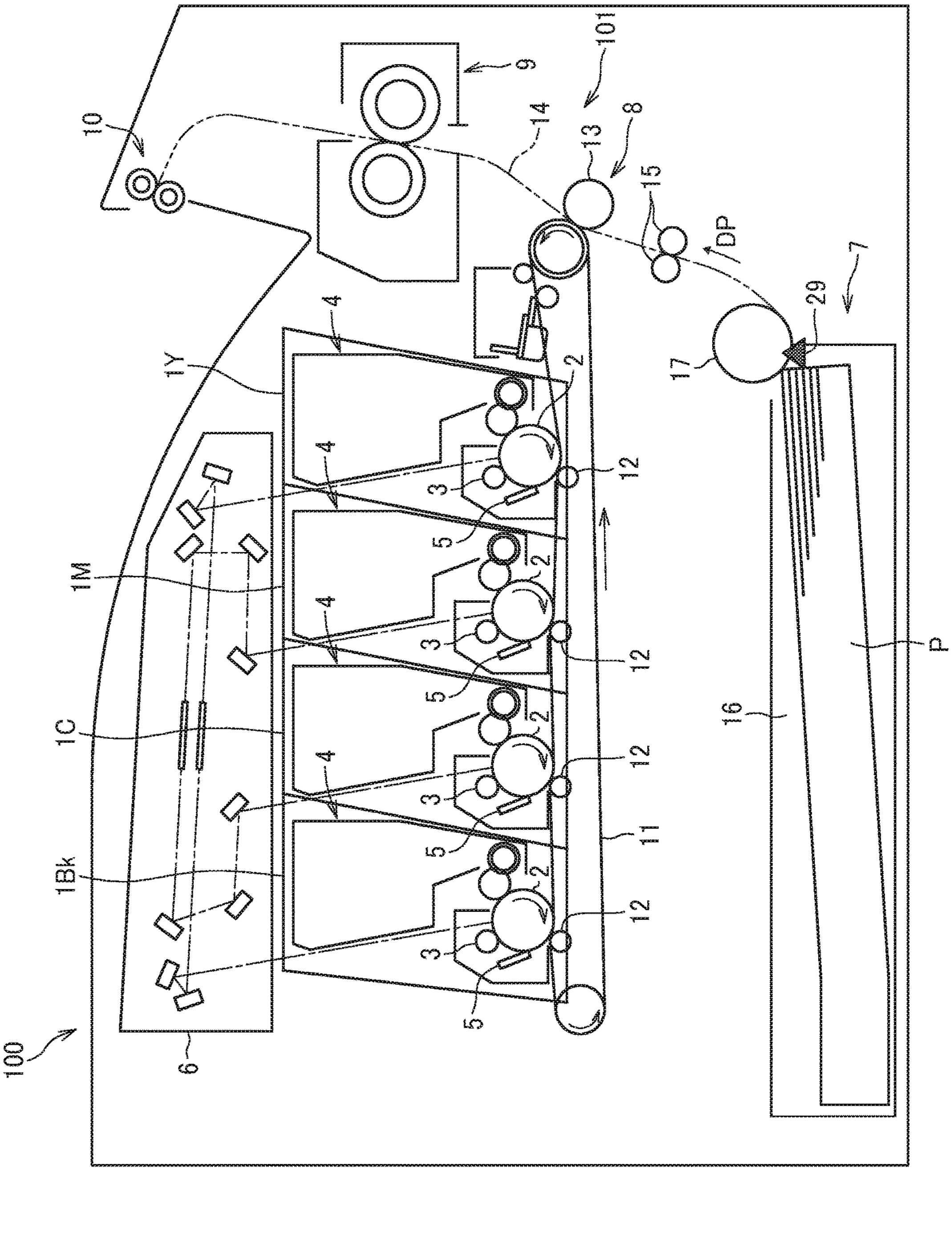
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to drawings, a description is provided of embodiments of the present disclosure. In the drawings, identical reference numerals are assigned to identical elements and equivalents and redundant descriptions of the identical elements and the equivalents are summarized or omitted properly.

FIG. 1 is a schematic cross-sectional view of an image forming apparatus 100 according to an embodiment of the present disclosure.

As illustrated in FIG. 1, the image forming apparatus 100 includes four image forming units 1Y, 1M, 1C, and 1Bk that are installed in an apparatus body of the image forming apparatus 100 such that the image forming units 1Y, 1M, 1C, and 1Bk are attached to and removed from the apparatus body of the image forming apparatus 100. The image forming units 1Y, 1M, 1C, and 1Bk have a similar construction. However, the image forming units 1Y, 1M, 1C, and 1Bk contain developers in different colors, that is, yellow, magenta, cyan, and black, respectively. The developers correspond to color separation components for a color image. Each of the image forming units 1Y, 1M, 1C, and 1Bk includes a photoconductor 2, a charger 3, a developing device 4, and a cleaner 5. The photoconductor 2 is drum-shaped and serves as an image bearer. The charger 3 charges a surface of the photoconductor 2. The developing device 4 supplies toner as the developer to the surface of the photoconductor 2 to form a toner image. The cleaner 5 cleans the surface of the photoconductor 2.

The image forming apparatus 100 further includes an exposure device 6, a sheet feeder 7 serving as a recording medium supply, a transfer device 8, a fixing device 9 serving as a heating device, and an output device 10. The exposure device 6 exposes the surface of each of the photoconductors 2 and forms an electrostatic latent image thereon. The sheet feeder 7 includes a sheet tray 16, a feed roller 17, and a sheet sensor 29. For example, the sheet sensor 29 is disposed in the sheet feeder 7. The image forming apparatus 100 further includes a sheet conveyance path 14 serving as a recording medium conveyance path. The sheet feeder 7 supplies a sheet P serving as a recording medium to the sheet conveyance path 14. The transfer device 8 transfers the toner image formed on each of the photoconductors 2 onto the sheet P. The fixing device 9 fixes the toner image transferred onto a surface of the sheet P thereon. The output device 10 ejects the sheet P onto an outside of the image forming apparatus 100. Each of the image forming units 1Y, 1M, 1C, and 1Bk, that includes the photoconductor 2 and the charger 3, the exposure device 6, the transfer device 8, and the like construct an image forming device that forms the toner image on the sheet P. The image forming apparatus 100 further includes a conveyance device 101 that includes the sheet feeder 7, the sheet sensor 29, the sheet conveyance path 14, and the fixing device 9.

The transfer device 8 includes an intermediate transfer belt 11, four primary transfer rollers 12, and a secondary transfer roller 13. The intermediate transfer belt 11 is an endless belt serving as an intermediate transferor. The primary transfer rollers 12 serve as primary transferors. The secondary transfer roller 13 serves as a secondary transferor. The intermediate transfer belt 11 is stretched taut across a plurality of rollers. The primary transfer rollers 12 transfer yellow, magenta, cyan, and black toner images formed on the photoconductors 2 onto the intermediate transfer belt 11, respectively, thus forming a full color toner image on the intermediate transfer belt 11. The secondary transfer roller 13 transfers the full color toner image formed on the intermediate transfer belt 11 onto the sheet P. The plurality of primary transfer rollers 12 is pressed against the photoconductors 2, respectively, via the intermediate transfer belt 11. Accordingly, the intermediate transfer belt 11 contacts each of the photoconductors 2, forming a primary transfer nip therebetween. On the other hand, the secondary transfer roller 13 is pressed against one of the plurality of rollers across which the intermediate transfer belt 11 is stretched taut, via the intermediate transfer belt 11. Thus, a secondary transfer nip is formed between the secondary transfer roller 13 and the intermediate transfer belt 11.

The sheet conveyance path 14 is provided with a timing roller pair 15 at a position between the sheet feeder 7 and the secondary transfer nip defined by the secondary transfer roller 13. A pair of rollers such as the timing roller pair 15 disposed on the sheet conveyance path 14 serves as a conveyor that conveys the sheet P through the sheet conveyance path 14.

Referring to FIG. 1, a description is provided of printing processes performed by the image forming apparatus 100 having the construction described above.

When the image forming apparatus 100 receives an instruction to start printing, a driver drives and rotates the photoconductor 2 of each of the image forming units 1Y, 1M, 1C, and 1Bk clockwise in FIG. 1. The charger 3 charges the surface of the photoconductor 2 uniformly at a high electric potential. The exposure device 6 exposes the charged surfaces of the photoconductors 2, respectively, according to image data (e.g., print data) sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the image forming units 1Y, 1M, 1C, and 1Bk supplies toner to the electrostatic latent image formed on the photoconductor 2, forming a toner image thereon.

The toner images formed on the photoconductors 2 reach the primary transfer nips defined by the primary transfer rollers 12 in accordance with rotation of the photoconductors 2, respectively. The primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11, thus forming a full color toner image thereon. The full color toner image formed on the intermediate transfer belt 11 is conveyed to the secondary transfer nip defined by the secondary transfer roller 13 in accordance with rotation of the intermediate transfer belt 11. The secondary transfer roller 13 transfers the full color toner image onto a sheet P conveyed in a sheet conveyance direction DP through the secondary transfer nip. The sheet P is supplied from the sheet tray 16. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. The secondary transfer roller 13 transfers the full color toner image onto the sheet P. Thus, the sheet P bears the full color toner image. After the toner image is transferred onto the intermediate transfer belt 11, the cleaner 5 removes residual toner remaining on the photoconductor 2 therefrom.

The sheet P transferred with the full color toner image is conveyed to the fixing device 9 that fixes the full color toner image on the sheet P. Thereafter, the output device 10 ejects the sheet P onto the outside of the image forming apparatus 100, thus finishing a series of printing processes.

A description is provided of a construction of the fixing device 9.

Figure 2:
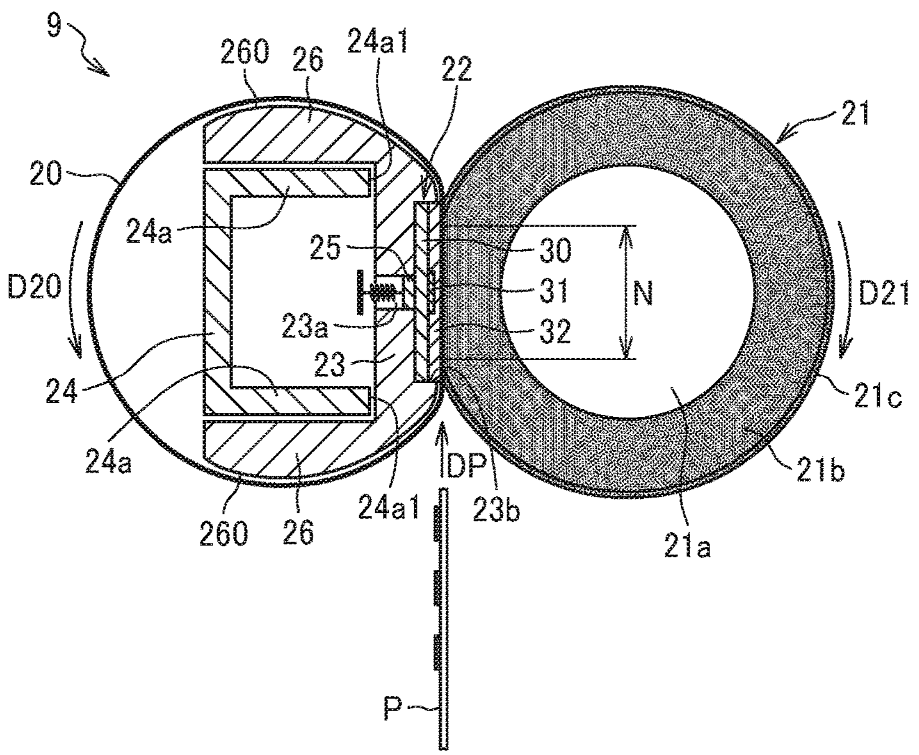
FIG. 2 is a schematic side cross-sectional view of a fixing device according to an embodiment of the present disclosure that is incorporated in the image forming apparatus depicted in FIG. 1.

As illustrated in FIG. 2, the fixing device 9 according to the embodiment includes a fixing belt 20, a pressure roller 21 serving as an opposed rotator or a pressure rotator, a heater 22, a heater holder 23 serving as a holder, a stay 24 serving as a support, and thermistors 25 serving as temperature detectors. The fixing belt 20 is an endless belt. The pressure roller 21 contacts an outer circumferential face of the fixing belt 20 to form a fixing nip N between the fixing belt 20 and the pressure roller 21. The heater 22 heats the fixing belt 20. The heater holder 23 holds or supports the heater 22. The stay 24 supports the heater holder 23. The heater 22 includes a base 30. The thermistors 25 contact a back face of the base 30, detecting a temperature of the base 30. A fixing device includes a fixing rotator as one example of a rotator incorporated in a heating device (e.g., the fixing device 9). The fixing device 9 according to the embodiment includes the fixing belt 20 as one example of the fixing rotator.

The fixing belt 20, the pressure roller 21, the heater 22, the heater holder 23, the stay 24, and the like extend in a longitudinal direction that is perpendicular to a paper surface in FIG. 2 and is parallel to a belt width direction of the fixing belt 20, an axial direction of the pressure roller 21, or a width direction of a sheet P.

The fixing belt 20 includes a tubular base layer that is made of polyimide (PI) and has an outer diameter of 25 mm and a thickness in a range of from 40 μm to 120 μm, for example. The fixing belt 20 further includes a release layer serving as an outermost surface layer. The release layer is made of fluororesin, such as perfluoroalkoxy alkane (PFA) and polytetrafluoroethylene (PTFE), and has a thickness in a range of from 5 μm to 50 μm to enhance durability of the fixing belt 20 and facilitate separation of the sheet P and a foreign substance from the fixing belt 20. The fixing belt 20 may further include an elastic layer that is interposed between the base layer and the release layer. The elastic layer is made of rubber or the like and has a thickness in a range of from 50 μm to 500 μm. The fixing belt according to the embodiment is a rubberless belt that does not include the elastic layer. The base layer of the fixing belt 20 may be made of heat-resistant resin such as polyetheretherketone (PEEK) or metal such as nickel (Ni) and stainless used steel (SUS), instead of polyimide. The fixing belt 20 may include an inner circumferential face that is coated with polyimide, PTFE, or the like and serves as a slide layer.

The pressure roller 21 has an outer diameter of 25 mm, for example. The pressure roller 21 includes a core metal 21*a*, an elastic layer 21*b*, and a release layer 21*c*. The core metal 21*a* is solid and made of iron. The elastic layer 21*b* is disposed on a surface of the core metal 21*a*. The release layer 21*c* coats an outer surface of the elastic layer 21*b*. The elastic layer 21*b* is made of silicone rubber and has a thickness of 3.5 mm, for example. In order to facilitate separation of the sheet P, the toner, and the foreign substance from the pressure roller 21, the release layer 21*c* that is made of fluororesin and has a thickness of approximately 40 μm, for example, is preferably disposed on the outer surface of the elastic layer 21*b*.

The fixing device 9 further includes a biasing member that biases and moves the pressure roller 21 toward the fixing belt 20, pressing the pressure roller 21 against the heater 22 via the fixing belt 20. Thus, the fixing nip N serving as a nip is formed between the fixing belt 20 and the pressure roller 21. The fixing device 9 further includes a driver that drives and rotates the pressure roller 21. As the pressure roller 21 rotates in a rotation direction D21, the pressure roller 21 drives and rotates the fixing belt 20 in a rotation direction D20.

The heater 22 contacts the inner circumferential face of the fixing belt 20. The heater 22 according to the embodiment is disposed opposite the pressure roller 21 via the fixing belt 20, serving as a nip formation pad that forms the fixing nip N between the fixing belt 20 and the pressure roller 21. The fixing belt 20 serves as a heated member heated by the heater 22. In other words, the heater 22 heats the sheet P conveyed through the fixing nip N via the fixing belt 20.

The heater 22 is a laminated heater that extends in the longitudinal direction thereof throughout an entire span of the fixing belt 20 in the longitudinal direction thereof. The heater 22 includes the base 30 (e.g., a substrate) that is platy, resistive heat generators 31 that are disposed on the base 30, and an insulating layer 32 that coats the resistive heat generators 31. The insulating layer 32 of the heater 22 contacts the inner circumferential face of the fixing belt 20. The resistive heat generators 31 generate heat that is conducted to the fixing belt 20 through the insulating layer 32. According to the embodiment, the base 30 includes a fixing belt opposed face that is disposed opposite the fixing belt 20 and the fixing nip N. The fixing belt opposed face mounts the resistive heat generators 31 and the insulating layer 32. Conversely, the resistive heat generators 31 and the insulating layer 32 may be mounted on a heater holder opposed face of the base 30, that is disposed opposite the heater holder 23. In this case, heat generated by the resistive heat generators 31 is conducted to the fixing belt through the base 30. Hence, the base 30 is preferably made of a material having an increased thermal conductivity, such as aluminum nitride. The base 30 made of the material having the increased thermal conductivity causes the resistive heat generators 31 to heat the fixing belt 20 sufficiently, even if the resistive heat generators 31 are disposed on the heater holder opposed face of the base 30.

The heater holder 23 and the stay 24 are disposed within a loop formed by the fixing belt 20 and disposed opposite the inner circumferential face of the fixing belt 20. The stay 24 includes a channel made of metal. The stay 24 has both lateral ends in the longitudinal direction thereof, that are supported by side plates of the fixing device 9, respectively. Since the stay 24 supports the heater holder 23 and the heater 22, in a state in which the pressure roller 21 is pressed against the fixing belt 20, the heater 22 receives pressure from the pressure roller 21 precisely. Thus, the fixing nip N is formed between the fixing belt 20 and the pressure roller 21 stably. According to the embodiment, the heater holder 23 has a thermal conductivity that is smaller than a thermal conductivity of the base 30.

Since the heater holder 23 is subject to high temperatures by heat from the heater 22, the heater holder 23 is preferably made of a heat-resistant material. For example, if the heater holder 23 is made of heat-resistant resin having a decreased thermal conductivity, such as liquid crystal polymer (LCP) and PEEK, the heater holder 23 suppresses conduction of heat thereto from the heater 22. Accordingly, the heater 22 heats the fixing belt 20 efficiently.

The heater holder 23 includes a recess 23*b* that holds the heater 22.

As illustrated in FIG. 2, the fixing device 9 further includes a plurality of guide ribs 26 that is combined with the heater holder 23 and guides the fixing belt 20. The plurality of guide ribs 26 is disposed upstream and downstream from the heater holder 23 in the sheet conveyance direction DP and is aligned in the longitudinal direction of the heater holder 23.

Each of the guide ribs 26 is substantially fan-shaped. Each of the guide ribs 26 includes a guide face 260 that is an arc or a projecting curved face that is curved along the inner circumferential face of the fixing belt 20 and extended in a circumferential direction of the fixing belt 20.

Figure 4:
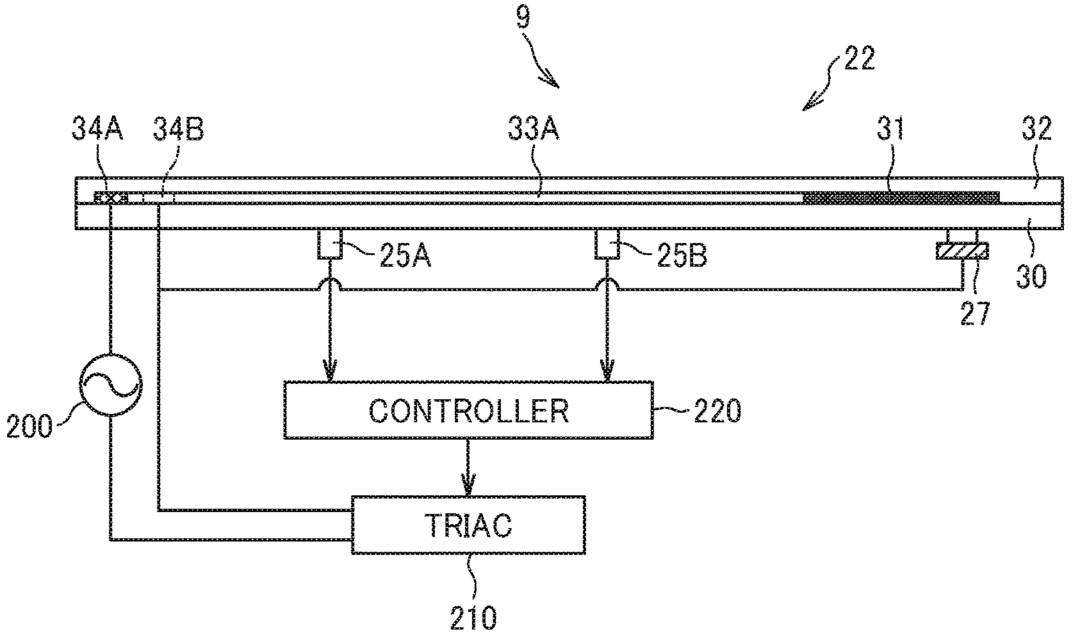
FIG. 4 is a diagram of a power supply circuit that supplies power to the heater depicted in FIG. 3.

The heater holder 23 includes openings 23*a* that penetrate through a body of the heater holder 23 in a thickness direction thereof. The thermistors 25 and a thermostat 27 described below with reference to FIG. 4 are placed in the openings 23*a*, respectively. The fixing device 9 further includes springs that bias and press the thermistors 25 and the thermostat 27 against the back face of the base 30 such that the thermistors 25 and the thermostat 27 detect temperatures of the heater 22, respectively. The fixing device 9 includes a lateral end thermistor 25A and a center thermistor 25B as described below with reference to FIG. 4. The lateral end thermistor 25A and the center thermistor 25B are also referred to as the thermistors 25.

A description is provided of fixing processes performed by the fixing device 9 according to the embodiment.

When printing starts, the driver drives and rotates the pressure roller 21 and the fixing belt 20 starts rotation in accordance with rotation of the pressure roller 21. Since the inner circumferential face of the fixing belt 20 is contacted and guided by the guide face 260 of each of the guide ribs 26, the fixing belt 20 rotates stably and smoothly. Additionally, as power is supplied to the resistive heat generators 31 of the heater 22, the heater 22 heats the fixing belt 20. In a state in which the temperature of the fixing belt 20 reaches a predetermined target temperature (e.g., a fixing temperature), as a sheet P bearing an unfixed toner image is conveyed through the fixing nip N formed between the fixing belt 20 and the pressure roller 21 as illustrated in FIG. 2, the fixing belt 20 and the pressure roller 21 fix the unfixed toner image on the sheet P under heat and pressure.

Figure 3:
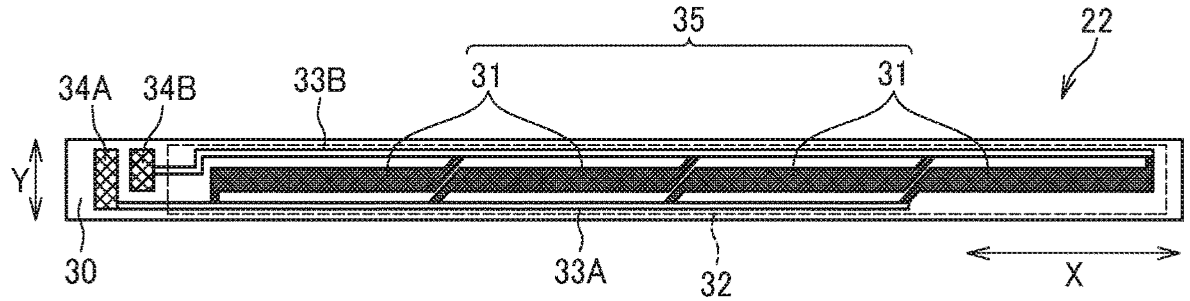
FIG. 3 is a plan view of a heater incorporated in the fixing device depicted in FIG. 2, illustrating resistive heat generators incorporated in the heater.

Referring to FIG. 3, a description is provided of a construction of the heater 22 of the fixing device 9 in detail.

FIG. 3 is a plan view of the heater 22 according to the embodiment.

As illustrated in FIG. 3, the base 30 that is platy has a mounting face that mounts the plurality of resistive heat generators 31 (e.g., the four resistive heat generators 31), feeders 33A and 33B serving as conductors, a first electrode 34A, and a second electrode 34B. The number of the resistive heat generators 31 is not limited to four.

FIG. 3 illustrates a longitudinal direction X (e.g., a horizontal direction in FIG. 3) that is perpendicular to a paper surface in FIG. 2. The longitudinal direction X defines the longitudinal direction of the heater 22 and the like and an arrangement direction in which the plurality of resistive heat generators 31 is arranged. The longitudinal direction X is hereinafter also referred to as the arrangement direction. FIG. 3 illustrates an orthogonal direction Y (e.g., a vertical direction in FIG. 3) that intersects the arrangement direction. According to the embodiment, the orthogonal direction Y is perpendicular to the arrangement direction and is different from a thickness direction of the base 30. The orthogonal direction Y is also referred to as an orthogonal direction perpendicular to the arrangement direction of the plurality of resistive heat generators 31 or the orthogonal direction. The orthogonal direction Y extends along the mounting face of the base 30, that mounts the resistive heat generators 31, and is parallel to a short direction of the heater 22 or the sheet conveyance direction DP in which the sheet P is conveyed through the fixing device 9.

The heater 22 includes a heat generation portion 35 that is divided into the plurality of resistive heat generators 31 arranged in the arrangement direction. The resistive heat generators 31 are electrically connected in parallel to the pair of electrodes 34A and 34B through the feeders 33A and 33B. The pair of electrodes 34A and 34B is disposed on one lateral end portion (e.g., a left end portion in FIG. 3) of the base 30 in the arrangement direction of the resistive heat generators 31. Each of the feeders 33A and 33B is made of a conductor having a resistance value smaller than a resistance value of the resistive heat generator 31. The adjacent resistive heat generators 31 define a gap therebetween, that is 0.2 mm or greater, preferably 0.4 mm or greater, in view of ensuring insulation between the adjacent resistive heat generators 31. If the gap between the adjacent resistive heat generators 31 is excessively great, the fixing belt 20 is subject to temperature decrease at an opposed portion thereof that is disposed opposite the gap. Hence, the gap is 5 mm or smaller, preferably 1 mm or smaller, in view of suppressing uneven temperature of the fixing belt 20 in the arrangement direction of the resistive heat generators 31.

The resistive heat generators 31 are made of a material having a positive temperature coefficient (PTC) property that is characterized in that the resistance value increases, that is, a heater output decreases, as the temperature increases.

Since the resistive heat generators 31 have the PTC property and the heat generation portion 35 is divided into the plurality of resistive heat generators 31 in the arrangement direction thereof, the heater 22 suppresses overheating of the fixing belt 20 when sheets P having a decreased size are conveyed over the fixing belt 20. For example, if a sheet P having a decreased width that is smaller than an entire length of the heat generation portion 35 in the longitudinal direction X of the heater 22 is conveyed through the fixing nip N, since the sheet P does not draw heat from the fixing belt 20 in an outboard span that is outboard from the sheet P in the longitudinal direction X of the fixing belt 20, the resistive heat generators 31 in the outboard span are subject to temperature increase. Since a constant voltage is applied to the resistive heat generators 31, when the temperature of the resistive heat generators 31 in the outboard span increases, the resistance value of the resistive heat generators 31 increases. Accordingly, an output, that is, a heat generation amount, of the heater 22 decreases relatively, suppressing temperature increase in each lateral end span of the fixing belt 20 in the longitudinal direction X thereof. Additionally, the plurality of resistive heat generators 31 is electrically connected in parallel, suppressing temperature increase in a non-conveyance span where the sheet P is not conveyed over the fixing belt 20 while retaining the printing speed. Alternatively, the heat generation portion 35 may include heat generators other than the resistive heat generators 31 having the PTC property. The resistive heat generators 31 may be arranged in a plurality of columns in the orthogonal direction Y of the heater 22.

For example, the resistive heat generator 31 is produced as below. Silver-palladium (AgPd), glass powder, and the like are mixed into paste. The paste coats the base 30 by screen printing or the like. Thereafter, the base 30 is subject to firing. According to the embodiment, the resistive heat generator 31 has a resistance value of 80Ω at an ambient temperature. Alternatively, the resistive heat generator 31 may be made of a resistive material such as a silver alloy (AgPt) and ruthenium oxide ($RuO_2$). The feeders 33A and 33B and the electrodes 34A and 34B are made of a material prepared with silver (Ag) or silver-palladium (AgPd) by screen printing or the like. Each of the feeders 33A and 33B is made of a conductor having a resistance value smaller than a resistance value of the resistive heat generator 31.

The base 30 is preferably made of ceramics, such as alumina and aluminum nitride, or a nonmetallic material, such as glass and mica, having an enhanced heat resistance and an enhanced insulation. According to the embodiment, the base 30 is made of alumina and has a short width of 8 mm in the orthogonal direction Y, a longitudinal length of 270 mm in the arrangement direction of the resistive heat generators 31, and a thickness of 1.0 mm. Alternatively, the base 30 may include a conductive layer made of metal or the like and an insulating layer disposed on the conductive layer. The metal of the base 30 is preferably aluminum, stainless steel, or the like that is available at reduced costs. The base 30 made of a stainless steel plate suppresses breakage due to thermal stress. In order to improve evenness of heat conducted from the heater 22 so as to enhance quality of an image formed on a sheet P, the base 30 may be made of a material that has an increased thermal conductivity such as copper, graphite, and graphene.

The insulating layer 32 is made of heat-resistant glass and has a thickness of 75 μm, for example. The insulating layer 32 covers the resistive heat generators 31 and the feeders 33A and 33B and insulates and protects the resistive heat generators 31 and the feeders 33A and 33B while retaining smooth sliding of the fixing belt 20 over the heater 22.

FIG. 4 is a diagram of the heater 22 according to the embodiment, illustrating a power supply circuit that supplies power to the heater 22.

As illustrated in FIG. 4, according to the embodiment, the power supply circuit for supplying power to the resistive heat generators 31 includes an alternating current power supply 200 that is electrically connected to the electrodes 34A and 34B of the heater 22. The power supply circuit further includes a triac 210 that controls an amount of power supplied to the resistive heat generators 31. The power supply circuit further includes a controller 220 that controls the amount of power supplied to each of the resistive heat generators 31 through the triac 210 based on temperatures of the resistive heat generators 31, that are detected by the lateral end thermistor 25A and the center thermistor 25B, respectively. The controller 220 includes a microcomputer that includes a central processing unit (CPU), a read only memory (ROM), a random access memory (RAM), and an input-output (I/O) interface. The controller 220 may be located inside the fixing device 9 or the apparatus body of the image forming apparatus 100.

According to the embodiment, the lateral end thermistor 25A serving as a first temperature detector is disposed opposite one lateral end span of the heater 22 in the arrangement direction of the resistive heat generators 31. The center thermistor 25B serving as a second temperature detector is disposed opposite a center span of the heater 22 in the arrangement direction of the resistive heat generators 31. The center span is within a minimum sheet conveyance span where a sheet P having a minimum width available in the image forming apparatus 100 is conveyed. The fixing device 9 further includes the thermostat 27 serving as a breaker. The thermostat 27 is disposed opposite another lateral end span of the heater 22 in the arrangement direction of the resistive heat generators 31. The thermostat 27 interrupts supplying power to the resistive heat generators 31 when a temperature of the resistive heat generator 31 is a predetermined temperature or higher. The lateral end thermistor 25A, the center thermistor 25B, and the thermostat 27 contact the back face of the base 30 to detect a temperature of the back face of the base 30. The lateral end thermistor 25A and the center thermistor 25B are also referred to as the thermistors 25.

Figure 5:
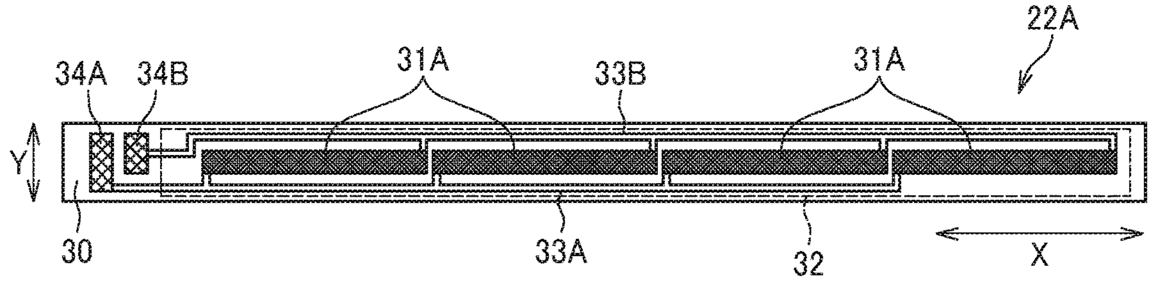
FIG. 5 is a plan view of a heater including resistive heat generators having a shape that is different from a shape of the resistive heat generators of the heater depicted in FIG. 3.
Figure 6:
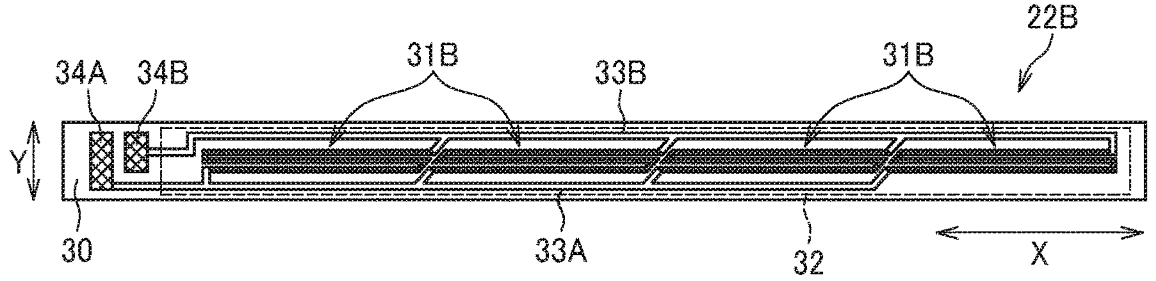
FIG. 6 is a plan view of a heater including resistive heat generators having a shape that is different from the shapes of the resistive heat generators of the heaters depicted in FIGS. 3 and 5.

According to the embodiment, the first electrode 34A and the second electrode 34B are disposed in an identical lateral end span of the heater 22 in the arrangement direction of the resistive heat generators 31. Alternatively, the first electrode 34A and the second electrode 34B may be disposed in one lateral end span and another lateral end span of the heater 22 in the arrangement direction of the resistive heat generators 31, respectively. The resistive heat generator 31 has shapes that are not limited to a shape according to the embodiment. For example, FIG. 5 illustrates a heater 22A that includes resistive heat generators 31A each of which is rectangular. FIG. 6 illustrates a heater 22B that includes resistive heat generators 31B each of which includes a linear portion. The linear portion turns to define a parallelogram substantially. As illustrated in FIG. 5, the heater 22A includes an extension that extends from the resistive heat generator 31A having a block shape to the feeder 33A or 33B in the orthogonal direction Y. The extension may be a part of the resistive heat generator 31A or may be made of a material equivalent to a material of the feeder 33A or 33B.

A description is provided of a construction of a comparative heating device that heats an image on a recording medium.

The comparative heating device includes temperature detecting elements and sheet detectors that are disposed opposite both lateral ends of the recording medium in a width direction thereof, respectively.

The temperature detecting elements detect temperatures of both lateral end spans of a fixing belt, respectively, preventing the fixing belt from suffering from temperature increase in both lateral end spans of the fixing belt in a longitudinal direction thereof and therefore preventing breakage of the fixing belt. However, if the temperature detectors are disposed opposite both lateral end spans of the fixing belt in the longitudinal direction thereof, respectively, the temperature detectors may increase manufacturing costs of the comparative heating device.

The sheet detectors are disposed opposite both lateral end spans of the fixing belt in the longitudinal direction thereof, respectively. The sheet detectors detect a size that is different from a preset size of a sheet serving as a recording medium. However, the sheet detectors do not detect a temperature inside the comparative heating device. For example, when the comparative heating device is started, the fixing belt may suffer from uneven temperature if temperatures of both lateral end spans of the fixing belt are lower than a temperature of a center span of the fixing belt in the longitudinal direction thereof. In this case, the sheet detectors may not detect the uneven temperature of the fixing belt and may not prevent faulty fixing caused by the uneven temperature. Thus, the comparative heating device may not retain a proper temperature of the fixing belt while reducing manufacturing costs.

A description is provided of three disadvantages of a fixing device or a conveyance device such as an image forming apparatus incorporating the fixing device.

A description is now given of a first disadvantage.

When a user instructs the image forming apparatus 100 to form an image on a sheet P having a minimum width available in the image forming apparatus 100, the user may place a smaller sheet P having a width smaller than the minimum width on the sheet tray 16 erroneously. In this case, the fixing belt 20 has an increased non-conveyance span that is within a heating span where the resistive heat generators 31 of the heater 22 are arranged in the longitudinal direction of the heater 22. The smaller sheet P is not conveyed over the fixing belt 20 in the non-conveyance span. Since the smaller sheet P does not draw heat from the non-conveyance span of the fixing belt 20, the fixing belt 20 suffers from overheating and resultant breakage. Additionally, the user may place the smaller sheet P on the sheet tray 16 such that the smaller sheet P is shifted from a proper position in a width direction of the smaller sheet P, that is parallel to the longitudinal direction of the heater 22. Accordingly, the smaller sheet P conveyed to the fixing device 9 may shift from a center position toward one lateral end or another lateral end of the fixing belt 20 in the longitudinal direction thereof. The above-described circumstances are hereinafter referred to as the first disadvantage. In order to overcome the first disadvantage, the image forming apparatus 100 is requested to detect failure and interrupt image formation, for example, so as to prevent breakage of the fixing belt 20. According to the embodiments of the present disclosure, a side fence disposed in the sheet tray 16 contacts a lateral edge of the sheet P placed on the sheet tray 16 in the width direction of the sheet P. The image forming apparatus 100 recognizes a size of the sheet P placed on the sheet tray 16 based on a position of the side fence. However, the user may not adjust the position of the side fence to the lateral edge of the sheet P placed on the sheet tray 16. In this case, the image forming apparatus 100 may not recognize the size of the sheet P precisely. Accordingly, even if the sheet P having a size that is different from a preset size is placed on the sheet tray 16, the image forming apparatus 100 may start image formation. Consequently, the sheet P having the size that is different from the preset size may be conveyed through the fixing device 9.

A description is now given of a second disadvantage.

Even if a sheet P having a size that is identical to the preset size is conveyed, unlike the sheet P described above in the description of the first disadvantage, the user may place the sheet P on the sheet tray 16 such that the sheet P is shifted from the proper position and the sheet P may be conveyed inside the image forming apparatus 100 in a state in which the sheet P is shifted from the proper position. In this case, an image transferred on the sheet P may also shift from the proper position on the sheet P. The above-described circumstance is hereinafter referred to as the second disadvantage. When images are formed on a plurality of sheets P continuously, the images transferred on the sheets P may shift from the proper position on the sheets P similarly. Hence, the image forming apparatus 100 preferably detects shifting of the sheet P early and interrupts image formation.

A description is now given of a third disadvantage.

The fixing device 9 may suffer from uneven temperature in both lateral end spans of the sheet P in the width direction thereof. For example, when the image forming apparatus 100 is warmed up from a state in which the image forming apparatus 100 is cooled, peripheral elements disposed in proximity to the fixing belt 20 draw heat from both lateral end spans of the fixing belt 20 in the longitudinal direction thereof. Hence, both lateral end spans of the fixing belt 20 are heated more slowly than a center span of the fixing belt 20 in the longitudinal direction thereof. Accordingly, while the sheet P is conveyed through the fixing nip N, the fixing belt 20 does not heat both lateral end spans of the sheet P sufficiently compared to a center span of the sheet P in the longitudinal direction of the fixing belt 20. Consequently, faulty fixing may occur in both lateral end spans of the sheet P in the width direction thereof. The above-described circumstance is hereinafter referred to as the third disadvantage.

To overcome the first disadvantage, the second disadvantage, and the third disadvantage described above, according to an embodiment of the present disclosure, the fixing device 9 incorporates the lateral end thermistor 25A, the center thermistor 25B, and the sheet sensor 29 serving as a recording medium detector.

Figure 7:
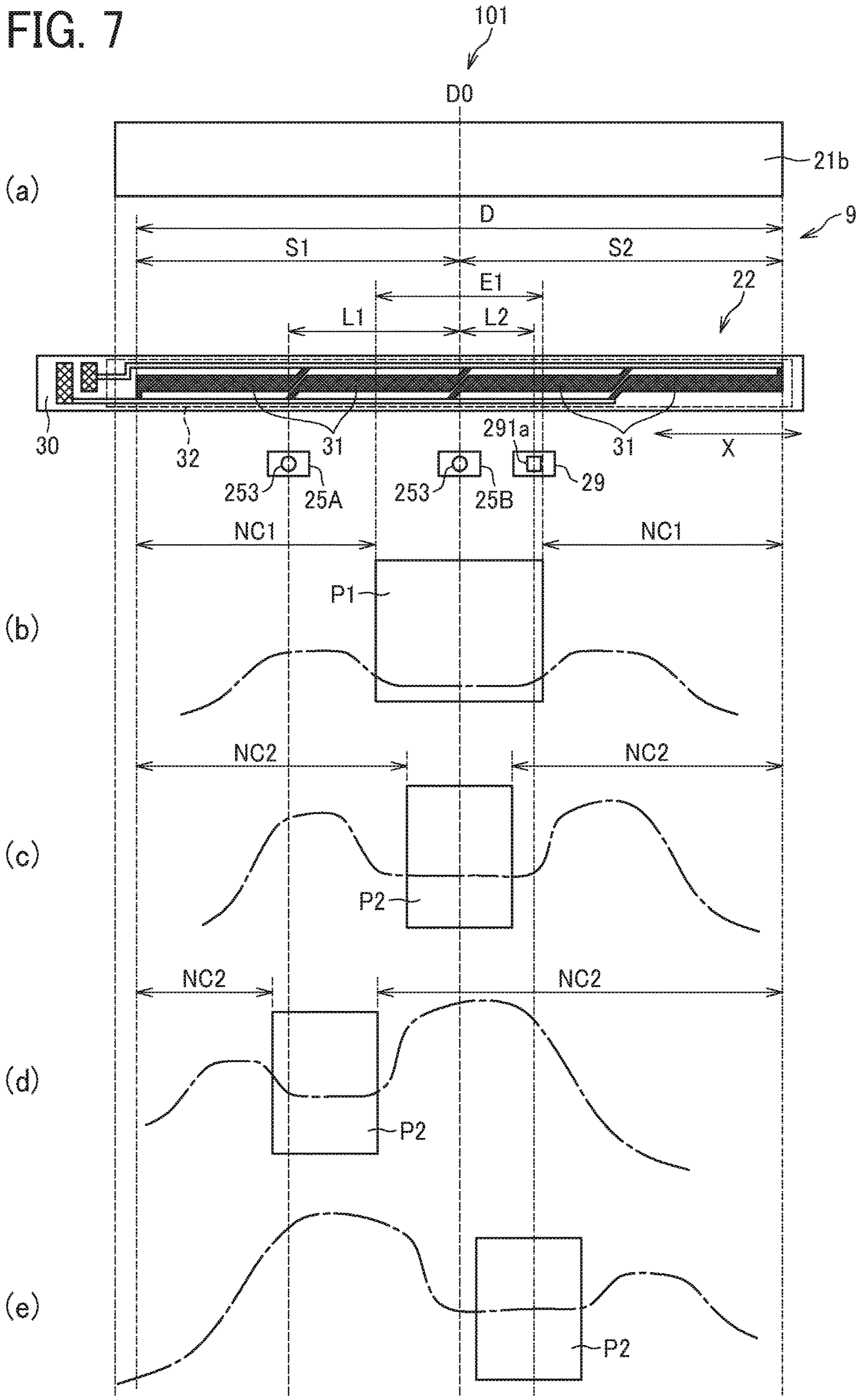
FIG. 7 is a diagram of a conveyance device incorporated in the image forming apparatus depicted in FIG. 1, illustrating elements of the conveyance device in a width direction of sheets in a section (a) and relations between the sheets and temperature profiles of the heater in a longitudinal direction thereof in sections (b), (c), (d), and (e)

Referring to FIG. 7, a description is provided of a construction of the conveyance device 101 incorporating the lateral end thermistor 25A, the center thermistor 25B, and the sheet sensor 29.

The longitudinal direction X (e.g., a horizontal direction in a section (a) in FIG. 7) is parallel to a width direction of sheets P1 and P2, the longitudinal direction of the fixing belt and the like, and the arrangement direction of the resistive heat generators 31. The longitudinal direction X is perpendicular to the sheet conveyance direction DP of the sheets P1 and P2 and is extended along a face of each of the sheets P1 and P2. The face of each of the sheets P1 and P2 is parallel to a paper surface in the section (a) in FIG. 7.

As illustrated in the section (a) in FIG. 7, the heater 22 has a heating span D serving as a main heat generation span. The lateral end thermistor 25A serving as the first temperature detector, the center thermistor 25B serving as the second temperature detector, and the sheet sensor 29 serving as the recording medium detector are disposed opposite the heating span D of the heater 22. The heating span D denotes a span in which the resistive heat generators 31 are arranged in the longitudinal direction X of the heater 22. The heating span D also denotes a heating span of the heater 22 in the longitudinal direction X thereof.

According to the embodiment, the lateral end thermistor 25A and the center thermistor 25B are situated in the fixing device 9. The sheet sensor 29 is situated in the sheet tray 16 of the sheet feeder 7 depicted in FIG. 1. The section (a) in FIG. 7 illustrates positions of the lateral end thermistor 25A, the center thermistor 25B, and the sheet sensor 29 in the longitudinal direction X of the heater 22, that denote positions from a center position D0 serving as a reference position of the sheet feeder 7 and the fixing device 9 in the width direction of the sheets P1 and P2. The sheets P1 and P2 have different sizes, respectively. The sheet P1 or P2 is placed onto the sheet tray 16 such that a center position on the sheet P1 or P2 in the width direction thereof corresponds to the center position D0. For example, the center position on the sheet P1 or P2 in the width direction thereof is superimposed on the center position D0. The center position D0 denotes the center position of the sheet P1 or P2 in the width direction thereof, that is placed in the sheet feeder 7 and the sheet conveyance path 14 inside the image forming apparatus 100 such that the sheet P1 or P2 does not shift from a proper position (e.g., the center position D0). The center position D0 denotes a center position of the elastic layer 21*b* of the pressure roller 21 in the longitudinal direction X thereof. According to the embodiment, the center position D0 also denotes a center position of the heating span D in the longitudinal direction X of the heater 22. The center position D0 serving as the center position of the sheets P1 and P2 in the width direction thereof or the center position of the elastic layer 21*b* in the longitudinal direction X of the pressure roller 21 is hereinafter also referred to as the center position D0.

The image forming apparatus 100 includes the conveyance device 101 according to the embodiment that includes the fixing device 9 incorporating the lateral end thermistor 25A and the center thermistor 25B and the sheet feeder 7 incorporating the sheet sensor 29. However, a conveyance device applied with the technology of the present disclosure is not limited to the conveyance device 101. For example, a heating device incorporating a heater may be the conveyance device applied with the technology of the present disclosure. That is, a heating device incorporating the first temperature detector, the second temperature detector, and the recording medium detector may be the conveyance device applied with the technology of the present disclosure. The fixing device 9 according to the embodiment of the present disclosure is one example of the heating device. Alternatively, the recording medium detector may be disposed at a proper position between an element (e.g., the sheet feeder 7) of an image forming apparatus (e.g., the image forming apparatus 100), that is placed with a recording medium, and an outside (e.g., the output device 10) of the apparatus body of the image forming apparatus, where the recording medium is ejected. Yet alternatively, a fixing device (e.g., the fixing device 9) disposed inside the image forming apparatus may be combined with other device incorporating the recording medium detector to construct the conveyance device applied with the technology of the present disclosure.

Figure 8:
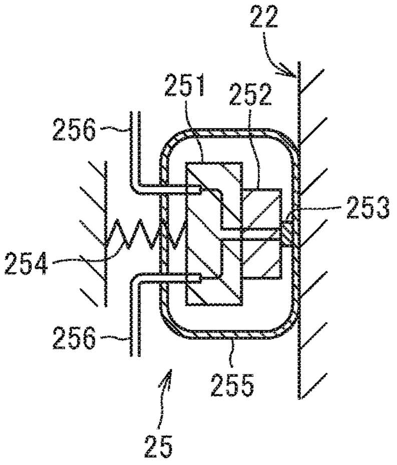
FIG. 8 is a cross-sectional view of a thermistor incorporated in the fixing device depicted in FIG. 2.

Referring to FIG. 8, a description is provided of the construction of the thermistor 25 representing the lateral end thermistor 25A and the center thermistor 25B in detail.

The lateral end thermistor 25A and the center thermistor 25B have an identical construction. However, the lateral end thermistor 25A is shifted from the center thermistor 25B in the longitudinal direction X of the heater 22. Alternatively, the lateral end thermistor 25A and the center thermistor 25B may have different constructions, respectively.

As illustrated in FIG. 8, the thermistor 25 includes a holder 251, an elastic member 252, a temperature detecting element 253 serving as a temperature detecting portion, a spring 254 serving as a biasing member, and an insulating sheet 255.

The holder 251 is made of a resin material such as LCP. The temperature detecting element 253 is mounted on a heater opposed face of the holder 251, that is disposed opposite the base 30 of the heater 22, via the elastic member 252. The elastic member 252 is made of a material that has a thermal conductivity and a rigidity that are smaller than a thermal conductivity and a rigidity of the holder 251. The elastic member 252 has elasticity and thermal insulation. The insulating sheet 255 is made of an insulating material such as PI and covers the holder 251, the elastic member 252, and the temperature detecting element 253. The spring 254 biases the holder 251 against the heater 22, pressing the temperature detecting element 253 against the heater 22 via the insulating sheet 255. The thermistor 25 further includes two wires 256 that are extended from the holder 251 and connected to the temperature detecting element 253. Each of the wires 256 is coated with insulating coating. The insulating coating that coats each of the wires 256 preferably has a thickness of 0.4 mm or greater, for example, in view of heat resistance. If the insulating coating has a thickness of 0.4 mm or smaller, a plurality of insulating coatings may be layered on the wire 256.

Figure 9:
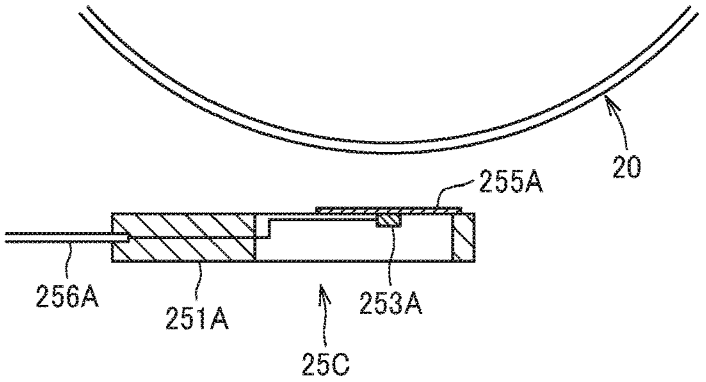
FIG. 9 is a cross-sectional view of a thermistor as a variation of the thermistor depicted in FIG. 8.

Alternatively, the thermistor 25 may be a non-contact type temperature detector that does not contact the heater 22. For example, as illustrated in FIG. 9, the thermistor 25 may be replaced with a non-contact type thermistor 25C that includes a holder 251A, a temperature detecting element 253A, and an insulating sheet 255A. As one example, the thermistor 25C is disposed below the fixing nip N depicted in FIG. 2 and disposed upstream from the fixing nip N in the sheet conveyance direction DP. Alternatively, the thermistor 25C may be disposed downstream from the fixing nip N in the sheet conveyance direction DP.

The temperature detecting element 253A is mounted on the holder 251A and is disposed opposite the outer circumferential face of the fixing belt 20 via the insulating sheet 255A. The thermistor 25C further includes two wires 256A that are held by the holder 251A. Each of the wires 256A has one end that is connected to the temperature detecting element 253A and another end that extends to an outside of the thermistor 25C. The thermistor 25C is requested to have a heat resistance that is smaller than a heat resistance of the contact-type thermistor 25. Hence, the holder 251A is made of a material having a decreased heat resistance and the thermistor 25C does not incorporate an elastic member. Additionally, the thermistor 25C does not incorporate a biasing member that biases the temperature detecting element 253A against the fixing belt 20.

Alternatively, the first temperature detector and the second temperature detector may detect a temperature of other element that contacts the heater 22. For example, a first thermal conductor 28 described below with reference to FIG. 14 may be interposed between the heater 22 and the thermistor 25. The thermistor 25 detects a temperature of the first thermal conductor 28. A definition that the thermistor 25 detects a temperature of the heater 22 also denotes that the thermistor 25 detects the temperature of the heater 22 via other element.

Figure 10A:
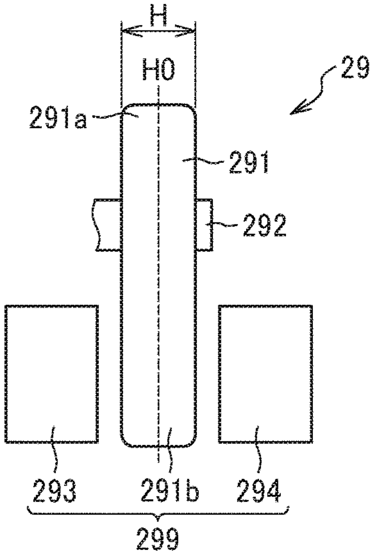
FIG. 10A is a front view of an entirety of a sheet sensor incorporated in the image forming apparatus depicted in FIG. 1.
Figure 10B:
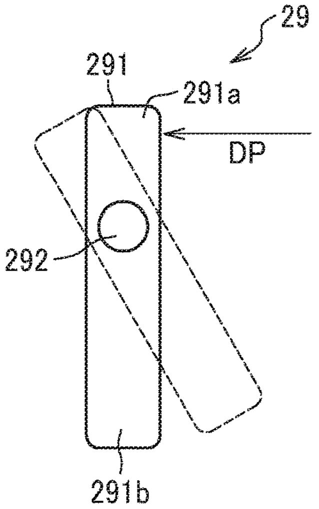
FIG. 10B is a side view of the sheet sensor depicted in FIG. 10A, illustrating rotation of a light shield incorporated therein.

FIGS. 10A and 10B illustrate one example of the sheet sensor 29. As illustrated in FIG. 10A, the sheet sensor 29 includes a light shield 291, a shaft 292, a light emitter 293, and a light receiver 294.

As illustrated in FIG. 10B, the light shield 291 rotates about the shaft 292. The light shield 291 includes a contacted portion 291*a*, that is, one end of the light shield 291, and a non-contacted portion 291*b*, that is, another end of the light shield 291. The contacted portion 291*a* is disposed on the sheet conveyance path 14 inside the image forming apparatus 100, for example, a part of the sheet conveyance path 14, that is inside the sheet tray 16, according to the embodiment. As a sheet P is conveyed in the sheet conveyance direction DP depicted in FIG. 10B, the sheet P comes into contact with the contacted portion 291*a*, rotating the light shield 291.

The light shield 291 switches between a posture illustrated with a solid line in FIG. 10B, in which the light shield 291 is not pressed by the sheet P, and a posture illustrated with a broken line in FIG. 10B, in which the light shield 291 is pressed by the sheet P and rotated. Thus, the light shield 291 switches between a shielding state in which the non-contacted portion 291*b* of the light shield 291 blocks light emitted from the light emitter 293 as illustrated in FIG. 10A and a non-shielding state in which the non-contacted portion 291*b* of the light shield 291 does not block light emitted from the light emitter 293 as illustrated in FIG. 10B. That is, the light shield 291 is switched between the shielding state and the non-shielding state by the sheet P that comes into contact with the light shield 291. The light emitter 293, the non-contacted portion 291*b*, and the light receiver 294 construct a photo coupler 299. The sheet sensor 29 has a sheet detecting span H where the contacted portion 291*a* spans in a width direction of the sheet sensor 29. The sheet detecting span H has a center position H0 in the width direction of the sheet sensor 29 as illustrated with a broken line in FIG. 10A.

FIGS. 10A and 10B illustrate the sheet sensor 29 as a transmission type optical sensor as one example. Alternatively, the sheet sensor 29 may be a reflective optical sensor. Yet alternatively, the sheet sensor 29 may be a push-button sensor including a button pressed by a sheet P conveyed through the sheet conveyance path 14, a magnetic sensor activated by rotation of a rotator pressed by a sheet P conveyed through the sheet conveyance path 14, or the like. Thus, the recording medium detector may employ a proper mechanism.

The sheet Pb illustrated in a section (b) in FIG. 7 has a minimum width available in the image forming apparatus 100. The sheet P1 defines a sheet conveyance span E1 in the width direction of the sheet P1 as illustrated in the section (a) in FIG. 7. The center thermistor 25B and the sheet sensor 29 are disposed in the sheet conveyance span E1. The lateral end thermistor 25A is disposed outboard from the sheet conveyance span E1 in the longitudinal direction X of the heater 22.

The lateral end thermistor 25A is disposed farther from the center position D0 than the center thermistor 25B is in the longitudinal direction X of the heater 22. For example, the center thermistor 25B detects a temperature of the heater 22 in a center span of the heating span D in the longitudinal direction X of the heater 22. For example, if the heating span D is divided into three equal parts in the longitudinal direction X of the heater 22, the temperature detecting element 253 of the center thermistor 25B is disposed opposite a center part of the heating span D of the heater 22 in the longitudinal direction X thereof. According to the embodiment, the temperature detecting element 253 of the center thermistor 25B is disposed opposite the center position D0 of the heating span D of the heater 22. In other words, the center thermistor 25B is disposed opposite the center position D0 of the elastic layer 21*b* of the pressure roller 21. For example, if the heating span D is divided into the three equal parts in the longitudinal direction X of the heater 22, the temperature detecting element 253 of the lateral end thermistor 25A is disposed opposite one lateral end part of the heating span D of the heater 22 in the longitudinal direction X thereof. According to the embodiment, the temperature detecting element 253 of the lateral end thermistor 25A is disposed opposite the heater 22 at a position separated from the center position D0 for a length L1 in the longitudinal direction X of the heater 22.

The lateral end thermistor 25A is disposed in a first span S1 defined by the center position D0 of the heating span D. The sheet sensor 29 is disposed in a second span S2 defined by the center position D0 of the heating span D. The second span S2 is opposite to the first span S1 via the center position D0 in the longitudinal direction X of the heater 22. For example, no thermistor is disposed opposite the heater 22 in the second span S2 defined by the center position D0. The sheet sensor 29 is disposed in the second span S2. According to the embodiment, the contacted portion 291*a* of the sheet sensor 29 has a center position in the longitudinal direction X of the heater 22, that is separated from the center position D0 for a length L2 in the longitudinal direction X of the heater 22. For example, the center position H0 of the sheet detecting span H of the sheet sensor 29 depicted in FIG. 10A is separated from the center position D0 for the length L2 in the longitudinal direction X of the heater 22.

The length L2 is smaller than the length L1. For example, the sheet sensor 29 is disposed closer to the center position D0 than the lateral end thermistor 25A is in the longitudinal direction X of the heater 22.

Referring to FIG. 7, a description is provided of detection of failure as the first disadvantage described above with the lateral end thermistor 25A, the center thermistor 25B, and the sheet sensor 29.

The section (b) and sections (c), (d), and (e) in FIG. 7 illustrate temperatures of the base 30 of the heater 22 at a plurality of positions arranged in the longitudinal direction X of the heater 22, that is, the width direction of the sheets P1 and P2, with curves illustrated with alternate long and short dash lines. For example, the lateral end thermistor 25A and the center thermistor 25B detect temperatures that are illustrated with parts of the alternate long and short dash lines, that are disposed opposite the lateral end thermistor 25A and the center thermistor 25B, respectively. The heater 22 and the fixing belt 20 also have temperature changes illustrated with alternate long and short dash lines.

The section (b) in FIG. 7 illustrates a case that does not cause the first disadvantage. For example, the user places the sheet P1 having the minimum width that is available in the fixing device 9 on the sheet tray 16 properly and the sheet P1 is conveyed inside the image forming apparatus 100. In the case depicted in the section (b) in FIG. 7, both the lateral end thermistor 25A and the center thermistor 25B detect temperatures of the heater 22 within a proper range. The lateral end thermistor 25A detects a temperature of the heater 22 in a non-conveyance span NC1 where the sheet P1 is not conveyed, that is higher than a temperature of the heater 22 in the sheet conveyance span E1, that is detected by the center thermistor 25B. The sheet sensor 29 detects the sheet P1 that passes over the sheet sensor 29. Thus, the controller 220 depicted in FIG. 4 determines that the sheet P1 is conveyed inside the image forming apparatus 100 properly and image formation is performed.

The section (c) in FIG. 7 illustrates a case that causes the first disadvantage. The user places the sheet P2 having a smaller width smaller than the minimum width of the sheet P1, that is available in the fixing device 9, on the sheet tray 16 erroneously and the sheet P2 is conveyed inside the image forming apparatus 100 in a state in which the sheet P2 is not shifted. The state in which the sheet P2 is not shifted denotes that the center position of the sheet P2 is disposed opposite the center position D0. However, a slight amount of errors is allowed.

In the case depicted in the section (c) in FIG. 7, the sheet P2 is not conveyed in non-conveyance spans NC2. The non-conveyance spans NC2 are greater than the non-conveyance spans NC1, respectively, in the longitudinal direction X of the heater 22. Accordingly, the heater 22 has increased temperatures in both lateral end spans in the heating span D in the longitudinal direction X of the heater 22. Hence, the lateral end thermistor 25A detects a temperature that is higher than a temperature detected by the center thermistor 25B. Thus, a difference between the temperature detected by the lateral end thermistor 25A and the temperature detected by the center thermistor 25B increases. Consequently, the conveyance device 101 detects failure. Additionally, since the sheet P2 does not pass over the contacted portion 291*a* of the sheet sensor 29, the sheet sensor 29 does not detect the sheet P2. Thus, the conveyance device 101 detects failure.

The section (d) in FIG. 7 illustrates a case that causes the first disadvantage. The user places the sheet P2 having the smaller width smaller than the minimum width of the sheet P1, that is available in the fixing device 9, on the sheet tray 16 erroneously and the sheet P2 is conveyed inside the image forming apparatus 100 in a state in which the sheet P2 is shifted leftward in FIG. 7.

In the case depicted in the section (d) in FIG. 7, the sheet P2 is not conveyed in the non-conveyance span NC2 that encompasses the center thermistor 25B and an increased peripheral region of the center thermistor 25B. Accordingly, the center thermistor 25B detects an abnormally high temperature. Consequently, the conveyance device 101 detects failure. Additionally, the sheet sensor 29 does not detect the sheet P2. Thus, the conveyance device 101 detects failure.

The section (e) in FIG. 7 illustrates a case that causes the first disadvantage. The user places the sheet P2 having the smaller width smaller than the minimum width of the sheet P1, that is available in the fixing device 9, on the sheet tray 16 erroneously and the sheet P2 is conveyed inside the image forming apparatus 100 in a state in which the sheet P2 is shifted rightward in FIG. 7.

In the case depicted in the section (e) in FIG. 7, as the sheet P2 is shifted to the second span S2 where the lateral end thermistor 25A is not disposed, the lateral end thermistor 25A detects an abnormally high temperature compared to a case in which the sheet P2 is conveyed normally in a state in which the sheet P2 is not shifted. Thus, the conveyance device 101 detects failure.

As described above, the conveyance device 101 according to the embodiment, in each of the cases depicted in the sections (c), (d), and (e) in FIG. 7, detects failure caused by erroneous placement of the sheet P2 having the smaller width that is different from the minimum width of the sheet P1 or failure caused by erroneous placement of the sheet P2 and shifting of the sheet P2. Hence, as the conveyance device 101 detects failure, the image forming apparatus 100 interrupts image formation or decreases productivity. Accordingly, the conveyance device 101 prevents overheating of the fixing belt 20 and resultant breakage of the fixing belt 20. Thus, the conveyance device 101 overcomes the first disadvantage.

A description is provided of detection of failure as the second disadvantage described above with the lateral end thermistor 25A, the center thermistor 25B, and the sheet sensor 29.

If the sheet P1 having a proper size (e.g., the minimum width available in the image forming apparatus 100) is conveyed and shifted leftward in the section (a) in FIG. 7, the sheet sensor 29 does not detect the sheet P1. Thus, the conveyance device 101 detects failure. If the second disadvantage occurs, an image formed on the sheet P1 is shifted from a proper position, wasting the sheet P1, toner, and the like. To address the circumstance, the sheet sensor 29 detects failure when the first sheet P1 is conveyed from the sheet tray 16, saving the sheet P1 and toner. Alternatively, in order to cause the conveyance device 101 to detect failure if the sheet P1 having the proper size is conveyed and shifted leftward in the section (a) in FIG. 7, the sheet tray 16 may include a mechanism that facilitates shifting of the sheet P1 leftward in the section (a) in FIG. 7.

According to the embodiment, the lateral end thermistor 25A detects a temperature of one lateral end span of the heater 22 in the longitudinal direction X thereof, overcoming the third disadvantage of uneven temperature of the fixing belt 20.

The lateral end thermistor 25A is disposed outboard from the sheet conveyance span E1 in the longitudinal direction X of the heater 22. Hence, the lateral end thermistor 25A detects a temperature of the heater 22 in the non-conveyance span NC1 produced when the sheet P1 is conveyed. The lateral end thermistor 25A detects a temperature of the heater 22 in one lateral end span in the longitudinal direction X thereof, overcoming the third disadvantage of uneven temperature of the fixing belt 20 described above. On the other hand, in order to cause the conveyance device 101 to detect failure if the sheet sensor 29 does not detect the sheet P2 shifted as illustrated in the section (d) in FIG. 7, the sheet sensor 29 is preferably disposed in the sheet conveyance span E1, for example, at a lateral end or a position in proximity to the lateral end of the sheet conveyance span E1 in the longitudinal direction X of the heater 22. In view of the circumstances described above, according to the embodiment, the length L1 is greater than the length L2.

Figure 11:
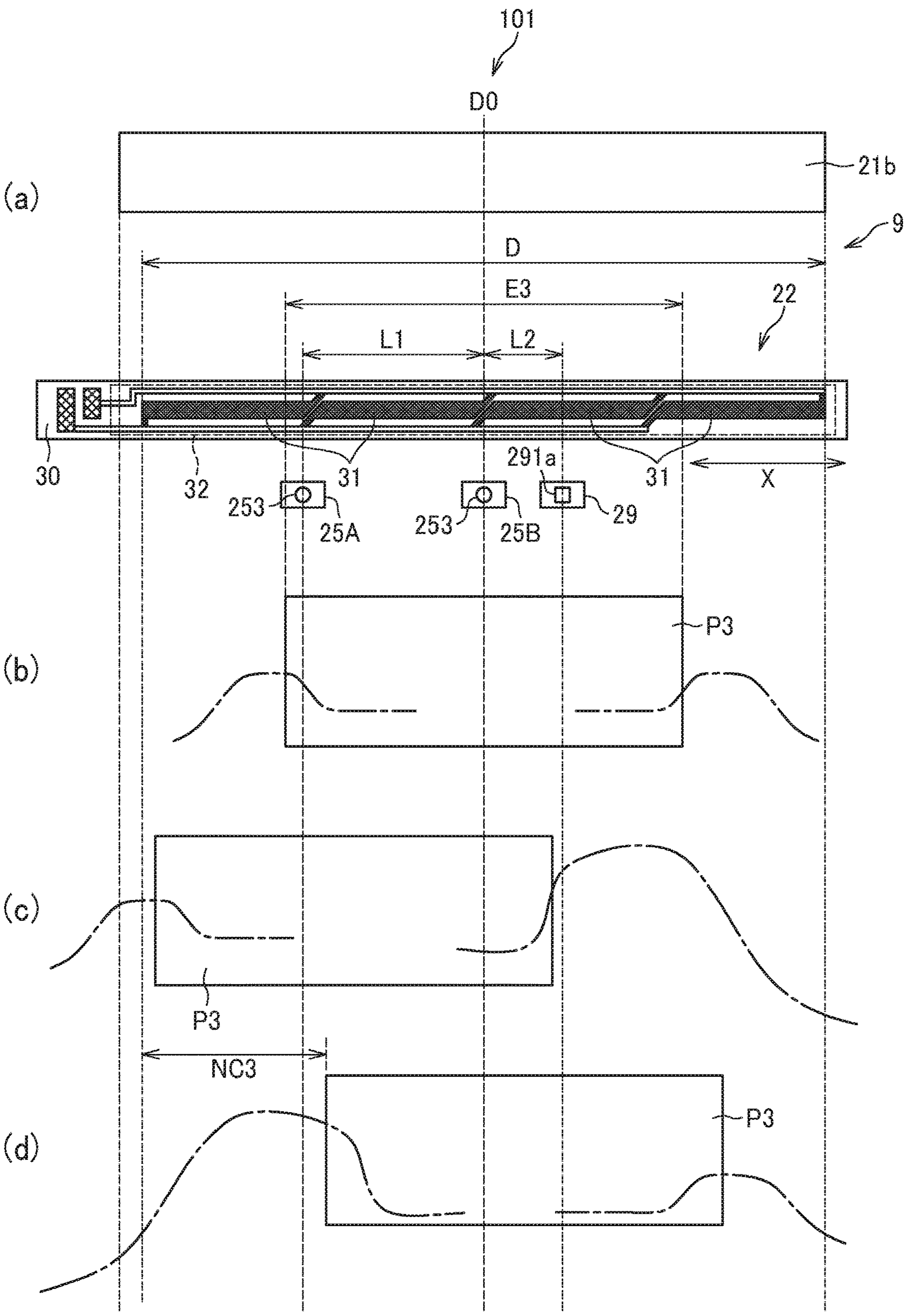
FIG. 11 is a diagram of the conveyance device depicted in FIG. 7, illustrating the elements of the conveyance device in a width direction of a maximum sheet in a section (a) and relations between the maximum sheet and temperature profiles of the heater in the longitudinal direction thereof in sections (b), (c), and (d)

FIG. 11 is a diagram of the conveyance device 101, illustrating a sheet P3 that has a maximum width available in the fixing device 9 according to the embodiment and is conveyed through the fixing device 9. FIG. 11 illustrates, in a section (a), the lateral end thermistor 25A, the center thermistor 25B, and the sheet sensor 29 arranged in the longitudinal direction X of the heater 22. FIG. 11 illustrates, in a section (b), the sheet P3 having the maximum width, that is conveyed in a state in which the sheet P3 is not shifted from a proper position. FIG. 11 illustrates, in a section (c), the sheet P3 having the maximum width, that is shifted leftward from the proper position. FIG. 11 illustrates, in a section (d), the sheet P3 having the maximum width, that is shifted rightward from the proper position.

As illustrated in the sections (a) and (b) in FIG. 11, the lateral end thermistor 25A according to the embodiment is disposed in a sheet conveyance span E3 where the sheet P3 having the maximum width among a plurality of widths available in the fixing device 9 is conveyed and disposed outboard from a sheet conveyance span where a sheet having a width smaller than the maximum width by one step in the longitudinal direction X of the heater 22 is conveyed. According to the embodiment, as one example, the sheet P3 having the maximum width is an A4 size sheet having a width of 210 mm. The sheet having the width smaller than the maximum width by one step is a B5 size sheet having a width of 182 mm. Hence, the lateral end thermistor 25A is disposed within a span defined between a position separated from the center position D0 for 91 mm and a position separated from the center position D0 for 105 mm in the longitudinal direction X of the heater 22. Alternatively, the lateral end thermistor 25A may be disposed within other span as long as the length L1 is greater than the length L2.

If the sheet P3 is shifted leftward as illustrated in the section (c) in FIG. 11, the sheet sensor 29 does not detect the sheet P3. Thus, the conveyance device 101 detects failure. If the sheet P3 is shifted rightward as illustrated in the section (d) in FIG. 11, the temperature detecting element 253 of the lateral end thermistor 25A is disposed opposite the heater 22 in a non-conveyance span NC3 where the sheet P3 is not conveyed. Accordingly, the lateral end thermistor 25A detects an increased temperature of the heater 22. Consequently, based on a difference between a temperature detected by the lateral end thermistor 25A and a temperature detected by the center thermistor 25B, the conveyance device 101 detects failure. As described above, the lateral end thermistor 25A is disposed in the sheet conveyance span E3 where the sheet P3 having the maximum width is conveyed. The lateral end thermistor 25A is disposed outboard from the sheet conveyance span where the sheet having the width smaller than the maximum width by one step in the longitudinal direction X of the heater 22 is conveyed. Accordingly, even if the sheet P3 having the maximum width is shifted from the proper position toward one lateral end or another lateral end of the heater 22 in the longitudinal direction X thereof, the conveyance device 101 detects failure (e.g., shifting of the sheet P3).

Figure 12:
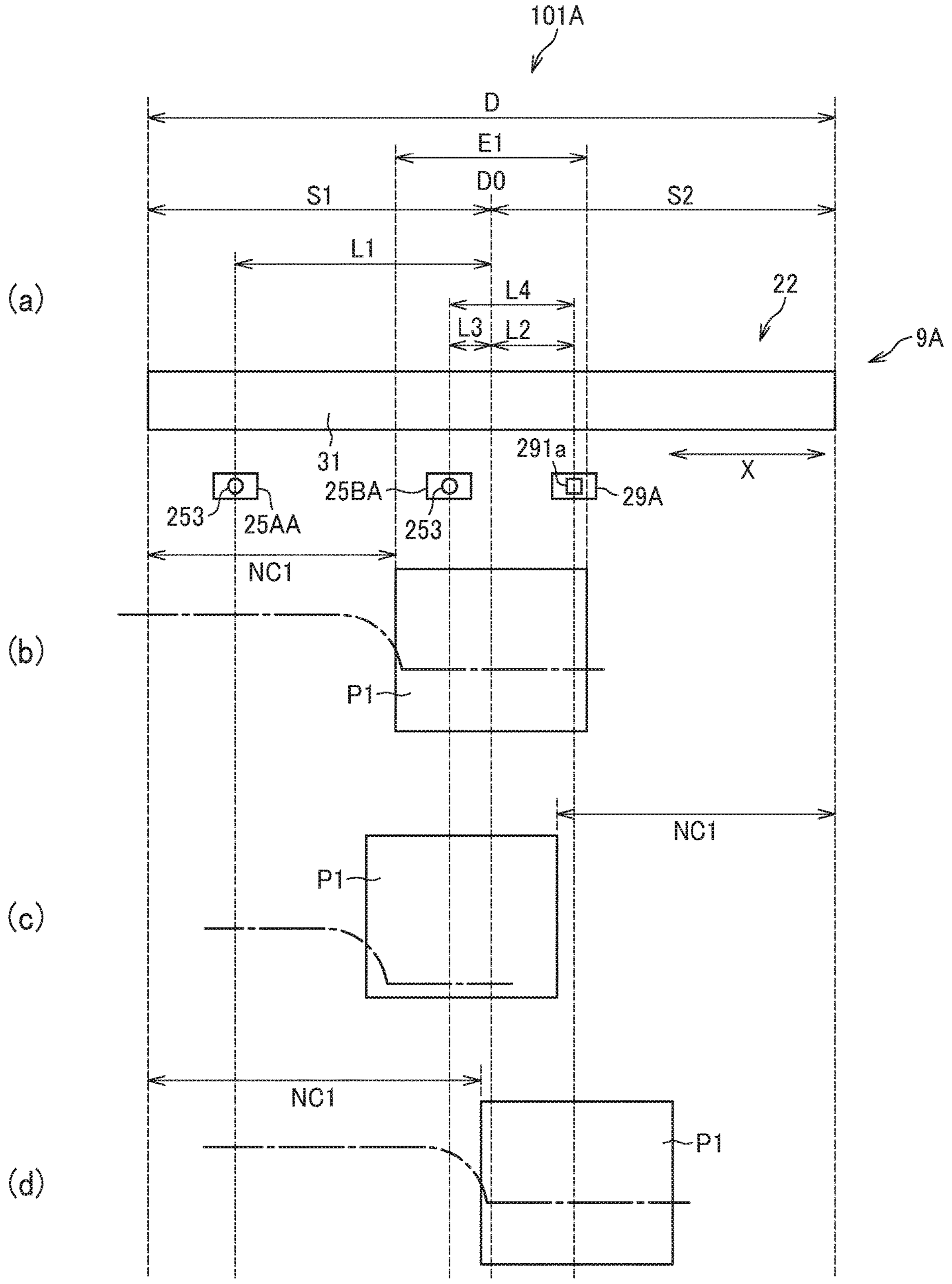
FIG. 12 is a diagram of a conveyance device as a variation of the conveyance device depicted in FIG. 7, illustrating elements of the conveyance device in a width direction of a minimum sheet in a section (a) and relations between the minimum sheet and temperature profiles of the heater in the longitudinal direction thereof in sections (b), (c), and (d)

Referring to FIG. 12, a description is provided of a configuration of a conveyance device 101A including a fixing device 9A incorporating a lateral end thermistor 25AA, a sheet sensor 29A, and a center thermistor 25BA according to an embodiment of the present disclosure, as a modification example of the center thermistor 25B.

FIG. 12 illustrates, in a section (a), the lateral end thermistor 25AA, the center thermistor 25BA, and the sheet sensor 29A arranged in the longitudinal direction X of the heater 22. FIG. 12 illustrates, in a section (b), the sheet P1 having the minimum width, that is conveyed in a state in which the sheet P1 is not shifted from a proper position. FIG. 12 illustrates, in a section (c), the sheet P1 that is shifted leftward from the proper position. FIG. 12 illustrates, in a section (d), the sheet P1 that is shifted rightward from the proper position. The section (a) in FIG. 12 simplifies a region where the resistive heat generators 31 are arranged in the longitudinal direction X of the heater 22.

As illustrated in the sections (a) and (b) in FIG. 12, the center thermistor 25BA according to the embodiment is disposed in the first span S1 that is opposite to the second span S2 where the sheet sensor 29A is disposed. The first span S1 is opposite to the second span S2 via the center position D0 of the elastic layer 21*b* of the pressure roller 21 in the longitudinal direction X of the heater 22. The center thermistor 25BA is disposed in the sheet conveyance span E1 where the sheet P1 is conveyed. For example, the center thermistor 25BA is separated from the center position D0 for the length L3 in the longitudinal direction X of the heater 22.

If the sheet P1 is shifted leftward as illustrated in the section (c) in FIG. 12, the sheet sensor 29A does not detect the sheet P1. Thus, the conveyance device 101A detects failure. If the sheet P1 is shifted rightward as illustrated in the section (d) in FIG. 12, the center thermistor 25BA is disposed in the non-conveyance span NC1 like the lateral end thermistor 25AA. Accordingly, a difference between a temperature detected by the center thermistor 25BA and a temperature detected by the lateral end thermistor 25AA decreases. Thus, the conveyance device 101A detects failure. For example, if the sheet P1 is not shifted from the proper position as illustrated in the section (b) in FIG. 12, a temperature detected by the center thermistor 25BA disposed in the sheet conveyance span E1 where the sheet P1 is conveyed is substantially different from a temperature detected by the lateral end thermistor 25AA disposed in the non-conveyance span NC1 where the sheet P1 is not conveyed. Hence, if the difference between the temperature detected by the center thermistor 25BA and the temperature detected by the lateral end thermistor 25AA decreases as described above, the conveyance device 101A detects failure. As described above, the center thermistor 25BA is shifted from the center position D0 toward the lateral end thermistor 25AA in the longitudinal direction X of the heater 22, compared to the center thermistor 25B depicted in FIG. 7. Accordingly, if the sheet P1 is shifted rightward as illustrated in the section (d) in FIG. 12, based on a relation (e.g., the difference) between the temperature detected by the center thermistor 25BA and the temperature detected by the lateral end thermistor 25AA, the conveyance device 101A detects failure readily.

As described above, the conveyance device 101A according to the embodiment detects failure if the sheet P1 is shifted toward one lateral end or another lateral end of the heater 22 in the longitudinal direction X thereof. Thus, the conveyance device 101A overcomes the second disadvantage. After the conveyance device 101A detects failure, the image forming apparatus 100 interrupts image formation, preventing an image from being transferred onto an inappropriate position on the sheet P1 that is shifted. Additionally, as illustrated in the sections (c), (d), and (e) in FIG. 7, even if the sheet P2 having the width smaller than the minimum width of the sheet P1 is conveyed, the conveyance device 101A detects failure like the conveyance device 101 described above with reference to FIG. 7.

According to the embodiment, the length L2 is combined with the length L3 to define a combined length L4 that is greater than a half of the sheet conveyance span E1 in the longitudinal direction X of the heater 22. That is, the combined length L4 is greater than a half of the minimum width of the sheet P1. Accordingly, a distance between the center thermistor 25BA and the sheet sensor 29A is greater than a distance between the center thermistor 25B and the sheet sensor 29 depicted in FIG. 7 in the longitudinal direction X of the heater 22. That is, the center thermistor 25BA and the sheet sensor 29A are disposed in the sheet conveyance span E1 at one lateral end and another lateral end of the sheet conveyance span E1 in the longitudinal direction X of the heater 22. For example, the center thermistor 25BA is closer to one lateral end of the sheet conveyance span E1 than the center thermistor 25B depicted in FIG. 7 is. Accordingly, if the sheet P1 is not shifted from the proper position as illustrated in the section (b) in FIG. 12, the center thermistor 25BA detects a temperature of the heater 22 in the sheet conveyance span E1. The sheet sensor 29A detects the sheet P1 that passes over the sheet sensor 29A. If the sheet P1 is shifted leftward from the proper position as illustrated in the section (c) in FIG. 12, the sheet sensor 29A is subject to disposition in the non-conveyance span NC1 where the sheet P1 is not conveyed. If the sheet P1 is shifted rightward from the proper position as illustrated in the section (d) in FIG. 12, the center thermistor 25BA is subject to disposition in the non-conveyance span NC1 where the sheet P1 is not conveyed. Hence, the conveyance device 101A detects failure readily.

According to the embodiment, the length L2 is greater than the length L3. Accordingly, the center thermistor 25BA is disposed in the sheet conveyance span E1 and is disposed closer to the center position D0 than the sheet sensor 29A is. As illustrated in the section (b) in FIG. 12, since a lateral end of the sheet conveyance span E1 abuts on the non-conveyance span NC1 in the longitudinal direction X of the heater 22, the heater 22 is subject to temperature increase at the lateral end of the sheet conveyance span E1 compared to a center of the sheet conveyance span E1 in the longitudinal direction X of the heater 22. Accordingly, as the center thermistor 25BA is disposed at a position closer to the center position D0 in the sheet conveyance span E1, in a state in which the sheet P1 is not shifted from the proper position as illustrated in the section (b) in FIG. 12, the center thermistor 25BA does not detect an increased temperature erroneously. Thus, the conveyance device 101A is immune from erroneous determination that the center thermistor 25BA detects the increased temperature of the non-conveyance span NC1. The sheet sensor 29A is disposed in another lateral end of the sheet conveyance span E1 in the longitudinal direction X of the heater 22. If the sheet P1 is shifted leftward as illustrated in the section (c) in FIG. 12, the sheet sensor 29A is subject to disposition in the non-conveyance span NC1 where the sheet P1 is not conveyed. Thus, the conveyance device 101A detects failure readily.

Figure 13:
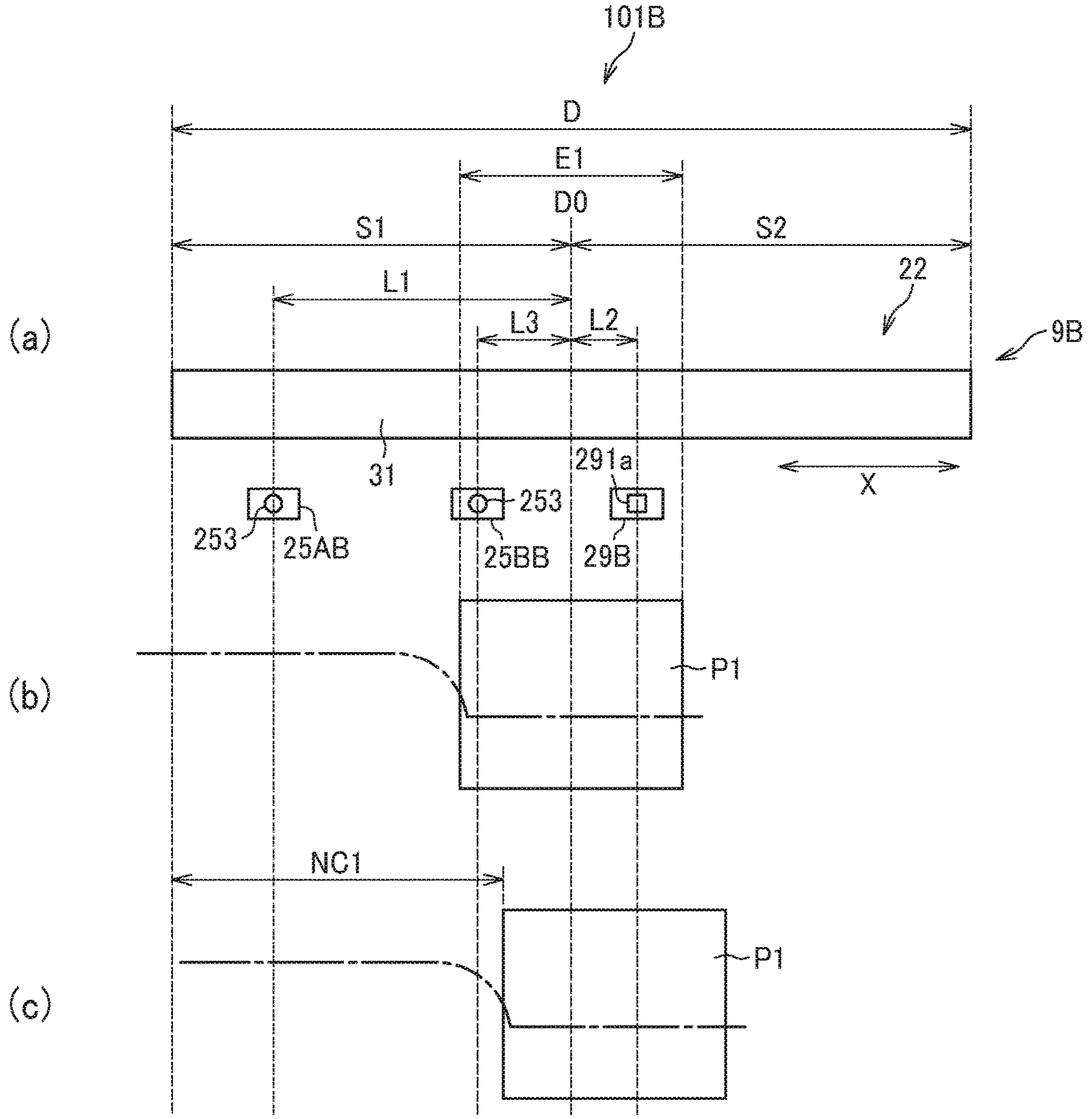
FIG. 13 is a diagram of a conveyance device as another variation of the conveyance device depicted in FIG. 7, illustrating elements of the conveyance device in the width direction of the minimum sheet in a section (a) and relations between the minimum sheet and temperature profiles of the heater in the longitudinal direction thereof in sections (b) and (c)

FIG. 13 illustrates a conveyance device 101B including a fixing device 9B incorporating a lateral end thermistor 25AB, a center thermistor 25BB, and a sheet sensor 29B according to an embodiment of the present disclosure. As illustrated in sections (a) and (b) in FIG. 13, the center thermistor 25BB is separated from the center position D0 for the length L3 and the sheet sensor 29B is separated from the center position D0 for the length L2 in the longitudinal direction X of the heater 22. The length L3 is greater than the length L2. Accordingly, the center thermistor 25BB is disposed in the sheet conveyance span E1 and is disposed closer to one lateral end of the sheet conveyance span E1 in the longitudinal direction X of the heater 22 than the center thermistor 25B depicted in FIG. 7 is. Hence, if the sheet P1 is shifted rightward as illustrated in a section (c) in FIG. 13, the center thermistor 25BB is subject to disposition in the non-conveyance span NC1 where the sheet P1 is not conveyed. Thus, the conveyance device 101B detects failure readily. Accordingly, even if the sheet P1 is shifted for a decreased length in the longitudinal direction X of the heater 22, the conveyance device 101B detects failure.

A lateral end thermistor (e.g., the lateral end thermistors 25A, 25AA, and 25AB), a center thermistor (e.g., the center thermistors 25B, 25BA, and 25BB), and a sheet sensor (e.g., the sheet sensors 29, 29A, and 29B) according to the embodiments described above are preferably applied to a conveyance device (e.g., the conveyance devices 101, 101A, and 101B) incorporating a fixing device (e.g., the fixing device 9) including a rotator (e.g., the fixing belt 20) that does not include an elastic layer or an image forming apparatus (e.g., the image forming apparatus 100) incorporating the conveyance device. The rotator of the fixing device has a decreased thermal capacity and is subject to temperature change. For example, the rotator is subject to temperature decrease within a sheet conveyance span (e.g., the sheet conveyance spans E1 and E3). The fixing device is subject to faulty fixing, causing toner to adhere to an interior of the fixing device. Additionally, a decreased amount of heat is conducted through the rotator in a longitudinal direction thereof, causing substantial temperature increase in a non-conveyance span (e.g., the non-conveyance spans NC1, NC2, and NC3). Accordingly, the first disadvantage, that is, breakage of the rotator, becomes more pronounced. To address the circumstance, the conveyance device having the construction described above prevents overheating of the rotator and resultant breakage of the rotator effectively. According to the embodiments described above, as the rotator that does not include the elastic layer, the fixing belt 20 including the base layer and the release layer as a surface layer is employed.

As illustrated in FIG. 1, the sheet sensor 29 is preferably disposed upstream from the fixing device 9 in the sheet conveyance direction DP. Accordingly, before the fixing device 9 fixes a toner image on a sheet P, the conveyance device 101, 101A, or 101B detects failure as the first disadvantage or the second disadvantage. As described above, the sheet sensor 29 is disposed upstream from the fixing device 9 in the sheet conveyance direction DP, preferably detecting failure early. According to the embodiments, the sheet sensor 29 is disposed in the sheet feeder 7, more preferably detecting failure early.

Since the sheet sensor 29 is disposed outside the fixing device 9, the sheet sensor 29 is not replaced when the fixing device 9 is replaced, thus reducing replacement costs of the fixing device 9.

Figure 14:
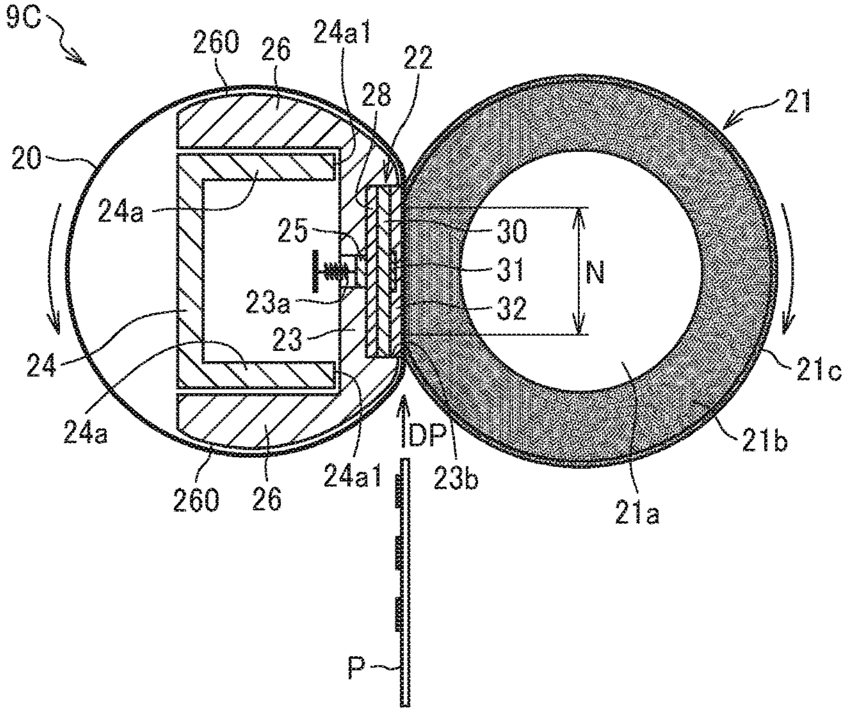
FIG. 14 is a side cross-sectional view of a fixing device according to another embodiment of the present disclosure, that is installable in the image forming apparatus depicted in FIG. 1, illustrating a first thermal conductor incorporated in the fixing device.

Referring to FIG. 14, a description is provided of a construction of a fixing device 9C according to an embodiment of the present disclosure, that is different from the fixing device 9 depicted in FIG. 2.

The fixing device 9C includes the first thermal conductor 28 serving as a thermal conductor interposed between the heater holder 23 and the heater 22.

The first thermal conductor 28 is made of a material having a thermal conductivity greater than a thermal conductivity of the base 30. According to the embodiment, the first thermal conductor 28 is a plate made of aluminum. Alternatively, the first thermal conductor 28 may be made of copper, silver, graphene, or graphite, for example. Since the first thermal conductor 28 is platy, the first thermal conductor 28 improves accuracy of positioning of the heater 22 with respect to the heater holder 23 and the first thermal conductor 28.

Next, a description is provided of a method for calculating the thermal conductivity described above.

A thermal diffusivity of a target object was measured and a thermal conductivity was calculated based on the thermal diffusivity.

The thermal diffusivity was measured with a thermal diffusivity-thermal conductivity measurement device, ai-Phase Mobile 1u, manufactured by ai-Phase Co., Ltd.

The thermal diffusivity was converted into the thermal conductivity based on a density and a specific heat capacity. The density was measured with a dry-process pycnometer, Accupyc 1330 manufactured by Shimadzu Corporation. The specific heat capacity was measured with a differential scanning calorimeter, DSC-60, manufactured by Shimadzu Corporation. Sapphire was used as a reference material having a known specific heat capacity. According to an embodiment, the specific heat capacity was measured five times to obtain an average at 50 degrees Celsius. Based on a density ρ, a specific heat capacity C, and a thermal diffusivity α obtained by the above-described measurement of the thermal diffusivity, a thermal conductivity λ is obtained by a formula (1) below.

$$\lambda=\rho\times C\times\alpha \quad (1)$$

According to the embodiment also, like in the embodiments described above, the first disadvantage, the second disadvantage, and the third disadvantage may occur. To address the circumstance, the fixing device 9C includes the thermistors 25 representing a lateral end thermistor (e.g., the lateral end thermistors 25A, 25AA, and 25AB) and a center thermistor (e.g., the center thermistors 25B, 25BA, and 25BB) that contact the first thermal conductor 28. Additionally, a sheet sensor (e.g., the sheet sensors 29, 29A, and 29B) is disposed upstream from the fixing device 9C in the sheet conveyance direction DP. Thus, the fixing device 9C detects and overcomes failure as the first disadvantage, the second disadvantage, and the third disadvantage like in the embodiments described above. For example, the lateral end thermistor, the center thermistor, and the sheet sensor detect an erroneous size of a sheet P, that is different from a preset size, and shifting of the sheet P, thus preventing temperature increase of a lateral end span of the fixing belt 20 in the longitudinal direction thereof. The lateral end thermistor detects uneven temperature of the lateral end span of the fixing belt 20 in the longitudinal direction thereof. Accordingly, the fixing device 9C prevents temperature increase of a lateral end span of the rotator (e.g., the fixing belt 20) in the longitudinal direction thereof and resultant breakage of the rotator at reduced costs. Additionally, the fixing device 9C suppresses uneven temperature of the lateral end span of the rotator in the longitudinal direction thereof.

Alternatively, each of the first thermal conductor 28 and a second thermal conductor described below may also include an opening similarly so that the thermistors 25 and thermostats are pressed against the back face of the base 30 through the openings. The first thermal conductor 28 suppresses uneven temperature of the heater 22 in the longitudinal direction thereof. Accordingly, the fixing device 9C employs the thermistors 25 that are available at reduced costs and have a decreased heat resistance.

Figure 15:
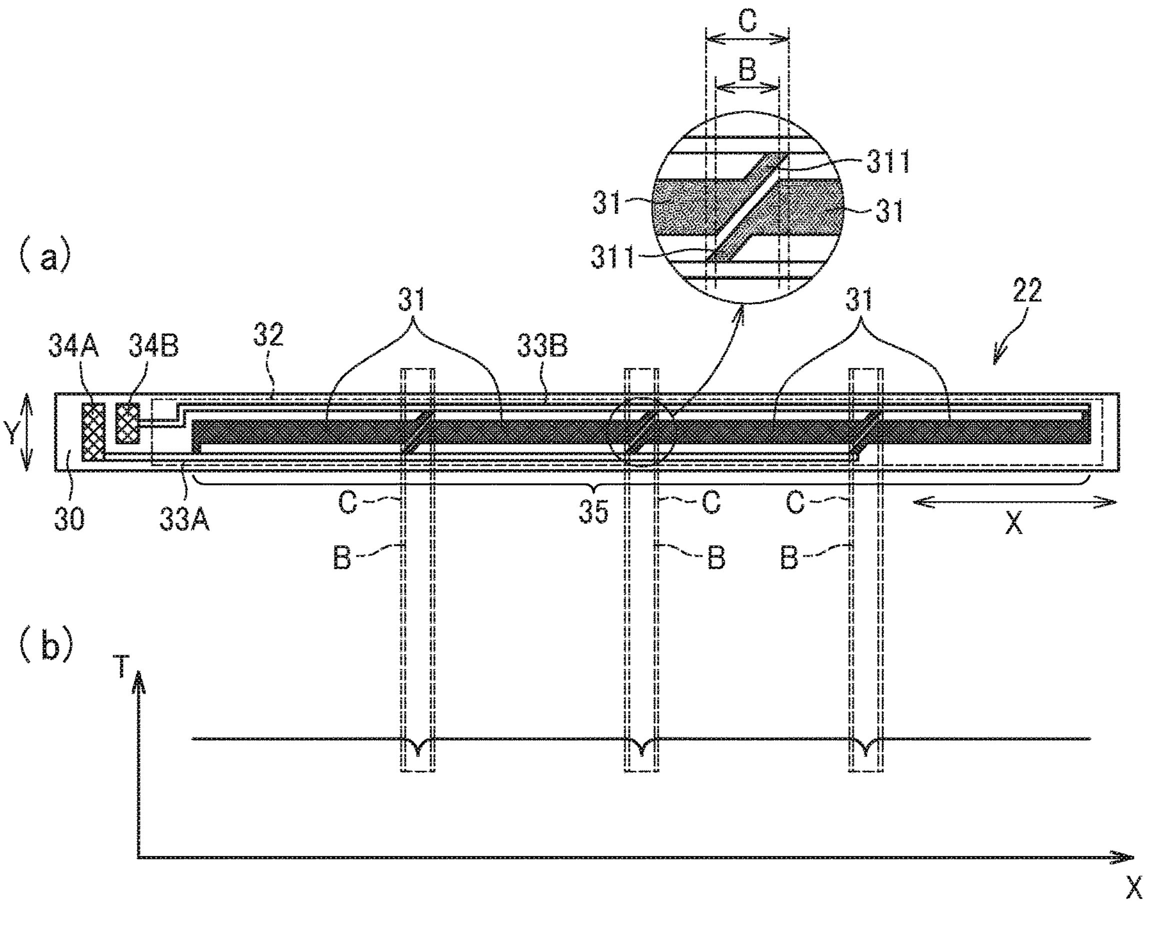
FIG. 15 is a diagram of the heater depicted in FIG. 3, illustrating a plan view of the heater in a section (a) and a temperature profile of a fixing belt heated by the heater in the longitudinal direction thereof in a section (b)

FIG. 15 is a diagram illustrating a temperature profile of the fixing belt 20 in the arrangement direction in which the resistive heat generators 31 are arranged. FIG. 15 illustrates, in a section (a), arrangement of the resistive heat generators 31 of the heater 22. FIG. 15 illustrates, in a section (b), a vertical axis that represents a temperature T of the fixing belt 20 and a horizontal axis that represents the longitudinal direction X of the fixing belt 20, that is, the arrangement direction in which the resistive heat generators 31 are arranged.

As illustrated in the sections (a) and (b) in FIG. 15, the heater 22 is divided into the plurality of resistive heat generators 31 arranged in the longitudinal direction X of the heater 22 to produce a gap B between the adjacent resistive heat generators 31 in the arrangement direction in which the resistive heat generators 31 are arranged. In other words, the plurality of resistive heat generators 31 of the heater 22 is arranged with the gap B between the adjacent resistive heat generators 31. The gap B defines a dividing region or a dividing span. An opposed portion of the resistive heat generators 31, that is disposed opposite the gap B, occupies an area smaller than an area of other portion of each of the resistive heat generators 31, thus generating a decreased amount of heat. Accordingly, the opposed portion of the fixing belt 20, that is disposed opposite the gap B, has a lower temperature compared to other portion of the fixing belt 20, causing uneven temperature of the fixing belt in the longitudinal direction thereof. The adjacent resistive heat generators 31 define an enlarged gap region C encompassing the gap B, serving as the dividing region, and a peripheral region thereof. The heater 22 and the fixing belt 20 suffer from temperature decreases also in opposed portions thereof, that are disposed opposite the enlarged gap region C. Similarly, the heater 22 suffers from temperature decrease also in an opposed portion thereof, that is disposed opposite the gap B. As illustrated in an enlarged view in the section (a) in FIG. 15, the gap B denotes a region encompassing an entirety of the dividing region between the adjacent resistive heat generators 31 serving as a main heat generation portion of the heater 22 in the arrangement direction in which the resistive heat generators 31 are arranged. The resistive heat generator 31 includes a joint 311 that is coupled with the feeder 33A or 33B. The enlarged gap region C encompasses the joints 311 in addition to the gap B. The joint 311 defines a part of the resistive heat generator 31, that extends substantially in the orthogonal direction Y perpendicular to the arrangement direction in which the resistive heat generators 31 are arranged and is coupled with the feeder 33A or 33B.

Figure 16:
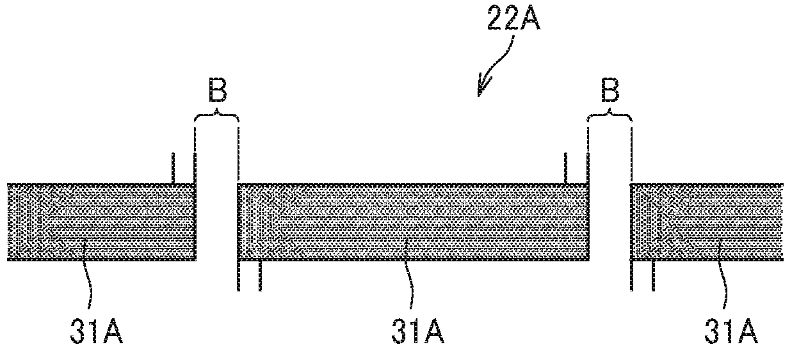
FIG. 16 is a diagram of the heater depicted in FIG. 5, illustrating a dividing region between the resistive heat generators.
Figure 17:
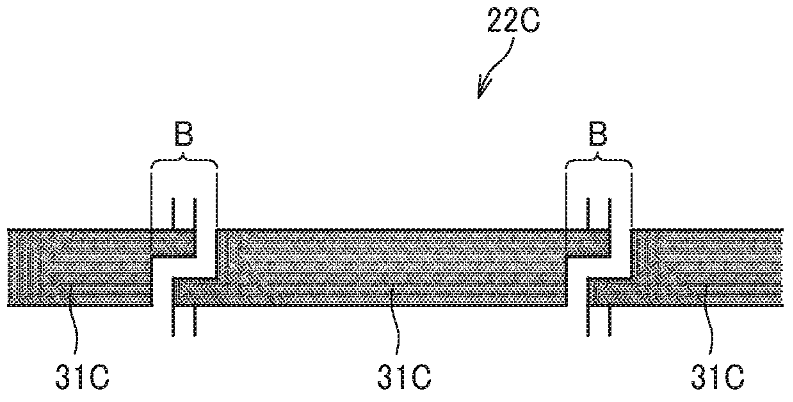
FIG. 17 is a diagram of a heater incorporating resistive heat generators that define a dividing region different from the dividing region depicted in FIG. 16.
Figure 18:
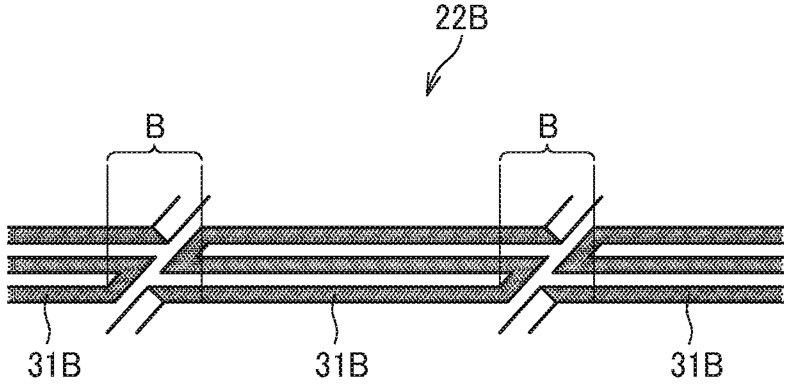
FIG. 18 is a diagram of the heater depicted in FIG. 6, illustrating a dividing region between the resistive heat generators.

FIG. 16 illustrates the heater 22A depicted in FIG. 5 that includes the resistive heat generators 31A that are rectangular. In the heater 22A also, a temperature of an opposed portion of the heater 22A, that is disposed opposite the gap B, is lower than a temperature of other portion of the heater 22A. FIG. 17 illustrates a heater 22C that includes a plurality of resistive heat generators 31C that is zigzag. In the heater 22C also, a temperature of an opposed portion of the heater 22C, that is disposed opposite the gap B, is lower than a temperature of other portion of the heater 22C. FIG. 18 illustrates the heater 22B depicted in FIG. 6 that includes the resistive heat generators 31B including the linear portion that defines the parallelogram. In the heater 22B also, a temperature of an opposed portion of the heater 22B, that is disposed opposite the gap B, is lower than a temperature of other portion of the heater 22B. As illustrated in FIGS. 15, 17, and 18, the adjacent resistive heat generators 31, 31C, and 31B overlap each other in the arrangement direction thereof, suppressing temperature decrease of the opposed portion of each of the heaters 22, 22C, and 22B, that is disposed opposite the gap B, compared to other portion of each of the heaters 22, 22C, and 22B.

The fixing device 9C according to the embodiment incorporates the first thermal conductor 28 that suppresses temperature decrease at the gap B and thereby suppresses uneven temperature of the fixing belt 20 in the longitudinal direction thereof.

A description is provided of a construction of the first thermal conductor 28 in detail.

As illustrated in FIG. 14, the first thermal conductor 28 is interposed between the heater 22 and the stay 24 in a horizontal direction in FIG. 14. Specifically, the first thermal conductor 28 is sandwiched between the heater 22 and the heater holder 23. For example, the first thermal conductor 28 has one face that contacts the back face of the base 30 of the heater 22 and another face that contacts the heater holder 23.

The stay 24 includes two perpendicular portions 24*a* that extend in a thickness direction of the heater 22 and the like. Each of the perpendicular portions 24*a* has a contact face 24*a*1 that contacts the heater holder 23 directly, supporting the heater holder 23, the first thermal conductor 28, and the heater 22. The contact faces 24*a*1 are disposed outboard from the resistive heat generators 31 in the orthogonal direction (e.g., a vertical direction in FIG. 14) perpendicular to the arrangement direction in which the resistive heat generators 31 are arranged. Thus, the stay 24 suppresses conduction of heat thereto from the heater 22, causing the heater 22 to heat the fixing belt 20 efficiently.

Figure 19:
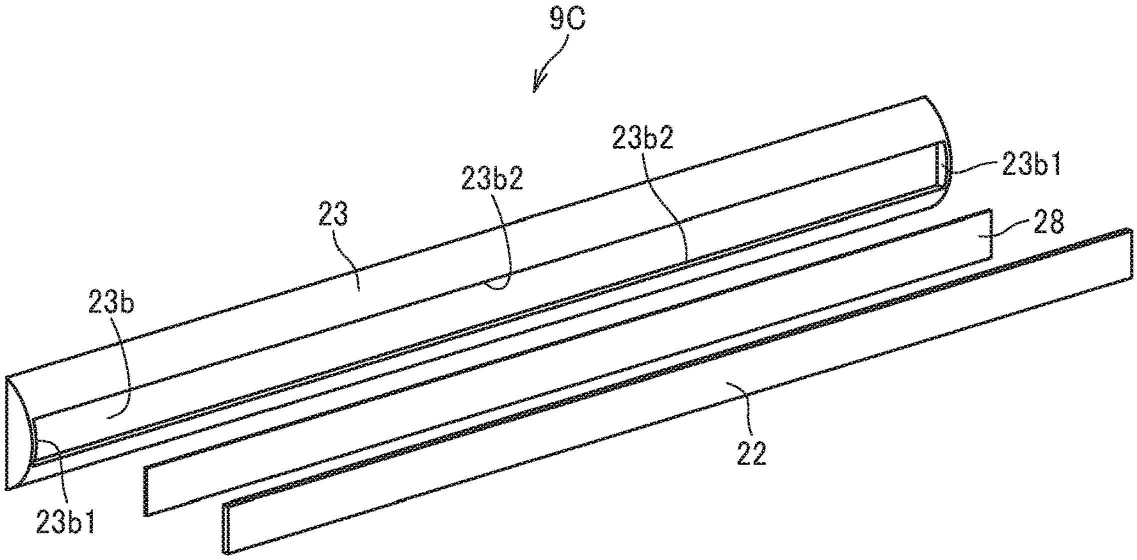
FIG. 19 is a perspective view of the heater, the first thermal conductor, and a heater holder incorporated in the fixing device depicted in FIG. 14.

As illustrated in FIG. 19, the first thermal conductor 28 is a plate that has a thickness of 0.3 mm, a length of 222 mm in a longitudinal direction thereof, and a width of 10 mm in an orthogonal direction perpendicular to the longitudinal direction of the first thermal conductor 28. According to the embodiment, the first thermal conductor 28 is constructed of a single plate. Alternatively, the first thermal conductor 28 may be constructed of a plurality of members. FIG. 19 omits illustration of the guide ribs 26 depicted in FIG. 14.

The first thermal conductor 28 is fitted to the recess 23*b* of the heater holder 23. The heater 22 is attached to the heater holder 23 from above the first thermal conductor 28. Thus, the heater holder 23 and the heater 22 sandwich and hold the first thermal conductor 28. The fixing device 9C according to the embodiment incorporates the first thermal conductor 28 having a length in the longitudinal direction thereof, which is equivalent to a length of the heater 22 in the longitudinal direction thereof. The heater holder 23 includes side walls 23*b*1, serving as arrangement direction restrictors, that are disposed at both lateral ends of the heater holder 23 in the longitudinal direction thereof (e.g., the arrangement direction in which the resistive heat generators 31 are arranged), respectively, and define the recess 23*b*. The side walls 23*b*1 restrict motion of the first thermal conductor 28 and the heater 22 in the longitudinal direction thereof. Thus, the side walls 23*b*1 restrict shifting of the first thermal conductor 28 in the arrangement direction in which the resistive heat generators 31 are arranged inside the fixing device 9C, improving efficiency in thermal conduction in a target span in the arrangement direction, that is, the longitudinal direction of the first thermal conductor 28. The heater holder 23 further includes side walls 23_b_2, serving as orthogonal direction restrictors, that are disposed at both ends of the heater holder 23 in the orthogonal direction perpendicular to the arrangement direction in which the resistive heat generators 31 are arranged, respectively, and define the recess 23_b_. The side walls 23_b_2 restrict motion of the first thermal conductor 28 and the heater 22 in the orthogonal direction.

Figure 20:
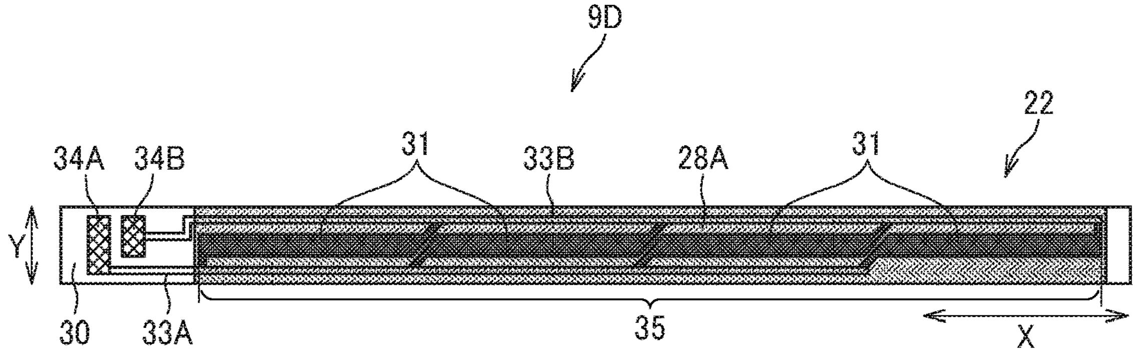
FIG. 20 is a plan view of the heater depicted in FIG. 15, that contacts a first thermal conductor as a variation of the first thermal conductor depicted in FIG. 19.
Figure 21:
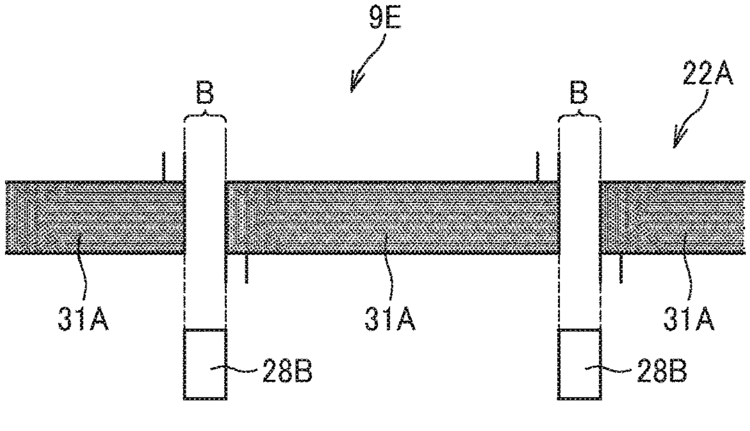
FIG. 21 is a plan view of the heater depicted in FIG. 16, illustrating a first thermal conductor as another variation of the first thermal conductor depicted in FIG. 19.

The first thermal conductor 28 may extend in a span other than a span in which the first thermal conductor 28 extends in the longitudinal direction thereof as illustrated in FIG. 19. For example, FIG. 20 illustrates a fixing device 9D that incorporates a first thermal conductor 28A. The first thermal conductor 28A extends in a span hatched in FIG. 20 and defined by the heat generation portion 35 in the longitudinal direction X of the heater 22. FIG. 21 illustrates a fixing device 9E incorporating first thermal conductors 28B. Each of the first thermal conductors 28B is disposed opposite and spans an entire span of the gap B in an arrangement direction in which the resistive heat generators 31A are arranged. FIG. 21 illustrates the resistive heat generators 31A shifted from the first thermal conductors 28B vertically in FIG. 21 for convenience. Practically, the resistive heat generators 31A are substantially leveled with the first thermal conductors 28B in an orthogonal direction perpendicular to the arrangement direction in which the resistive heat generators 31A are arranged. Alternatively, the first thermal conductors 28B may be disposed with respect to the resistive heat generators 31A with other arrangement. For example, the first thermal conductor 28B may be replaced by a first thermal conductor 28C that spans or covers a part or an entirety of the resistive heat generator 31A in the orthogonal direction Y as described with reference to FIG. 22.

Figure 22:
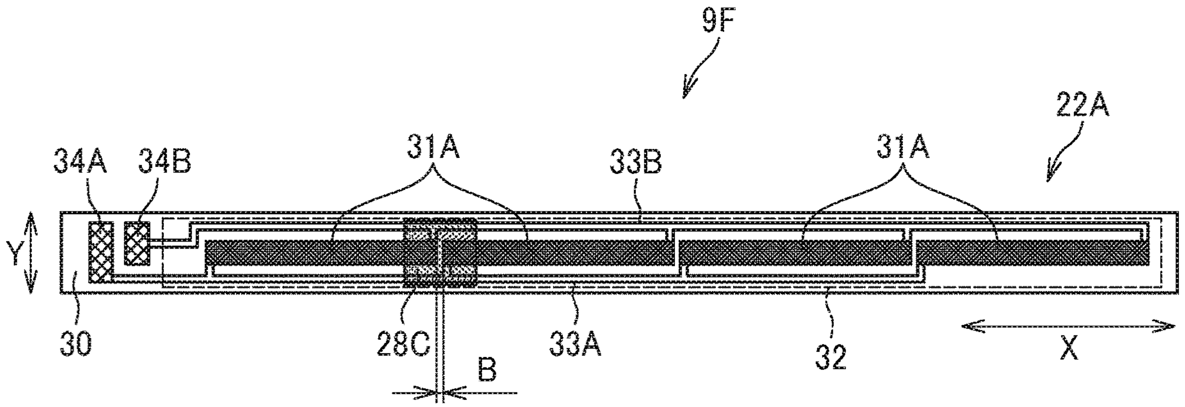
FIG. 22 is a plan view of the heater depicted in FIG. 16, illustrating a first thermal conductor as yet another variation of the first thermal conductor depicted in FIG. 19.

FIG. 22 illustrates a fixing device 9F including the first thermal conductor 28C that is disposed opposite and spans the gap B in the longitudinal direction X in which the resistive heat generators 31A of the heater 22A are arranged. The first thermal conductor 28C bridges the adjacent resistive heat generators 31A that sandwich the gap B. A state in which the first thermal conductor 28C bridges the adjacent resistive heat generators 31A denotes a state in which the first thermal conductor 28C overlaps the adjacent resistive heat generators 31A at least partially in the longitudinal direction X in which the resistive heat generators 31A are arranged. FIG. 21 illustrates the plurality of first thermal conductors 28B that is disposed opposite the plurality of gaps B, respectively. Alternatively, as illustrated in FIG. 22, the first thermal conductor 28C may be disposed opposite a part of the gaps B, for example, one of the gaps B. A state in which the first thermal conductor 28C spans the gap B in the longitudinal direction X in which the resistive heat generators 31A are arranged denotes that at least a part of the first thermal conductor 28C overlaps the gap B in the longitudinal direction X.

As illustrated in FIG. 14, as the pressure roller 21 applies pressure to the heater 22, the heater 22 and the heater holder 23 sandwich the first thermal conductors 28 such that the first thermal conductor 28 contacts the heater 22 and the heater holder 23. As the first thermal conductor 28 contacts the heater 22, the first thermal conductor 28 conducts heat generated by the heater 22 in the longitudinal direction X thereof with improved efficiency. The first thermal conductor 28 is disposed opposite the gaps B between the adjacent resistive heat generators 31 arranged in the longitudinal direction X of the heater 22. Thus, the first thermal conductor 28 improves efficiency in conduction of heat at the gaps B. Accordingly, the first thermal conductor 28 increases an amount of heat conducted to the gaps B in the longitudinal direction X of the heater 22 and increases the temperature of the heater 22 at the gaps B arranged in the longitudinal direction X of the heater 22, thus suppressing uneven temperature of the heater 22 in the longitudinal direction X thereof. Accordingly, the first thermal conductor 28 suppresses uneven temperature of the fixing belt 20 in the longitudinal direction X thereof. Consequently, the fixing belt 20 suppresses uneven fixing and uneven gloss of a toner image fixed on a sheet P. The heater 22 does not increase an amount of heat generation redundantly to attain sufficient fixing performance at the gaps B, causing the fixing device 9C to save energy. The first thermal conductor 28 extends throughout an entire span of the heat generation portion 35 depicted in FIG. 15 in the arrangement direction in which the resistive heat generators 31 are arranged. Accordingly, the first thermal conductor 28 improves efficiency in conduction of heat generated by the heater 22 in an entirety of a main heating span of the heater 22, that is disposed opposite an imaging span of a toner image formed on a sheet P conveyed through the fixing nip N. Consequently, the first thermal conductor 28 suppresses uneven temperature of the heater 22 and the fixing belt 20 in the longitudinal direction X thereof.

According to the embodiment, the first thermal conductor 28 is coupled with the resistive heat generators 31 having the PTC property described above, suppressing overheating of the fixing belt 20 in the non-conveyance span where a sheet P having a decreased size is not conveyed effectively. For example, the PTC property suppresses an amount of heat generated by the resistive heat generators 31 in the non-conveyance span. Additionally, the first thermal conductor 28 efficiently conducts heat from the non-conveyance span on the fixing belt 20 that suffers from temperature increase to a sheet conveyance span on the fixing belt 20, where the sheet P is conveyed, thus suppressing overheating of the fixing belt 20 in the non-conveyance span effectively.

Since the heater 22 generates heat in a decreased amount at the gap B between the adjacent resistive heat generators 31, the heater 22 has a decreased temperature also in a periphery of the gap B. To address this circumstance, the first thermal conductor 28 is preferably disposed also in the periphery of the gap B. For example, according to the embodiment, the first thermal conductor 28 is disposed opposite the enlarged gap region C depicted in FIG. 15. Hence, the first thermal conductor 28 improves efficiency in conduction of heat at the gap B and the periphery thereof in the longitudinal direction X of the heater 22 in which the resistive heat generators 31 are arranged, suppressing uneven temperature of the heater 22 in the longitudinal direction X thereof. According to the embodiment, the first thermal conductor 28 extends throughout the entire span of the heat generation portion 35 in the longitudinal direction X of the heater 22. Accordingly, the first thermal conductor 28 suppresses uneven temperature of the heater 22 and the fixing belt 20 in the longitudinal direction X thereof more effectively.

A description is provided of a construction of a fixing device 9G according to an embodiment of the present disclosure.

Figure 23:
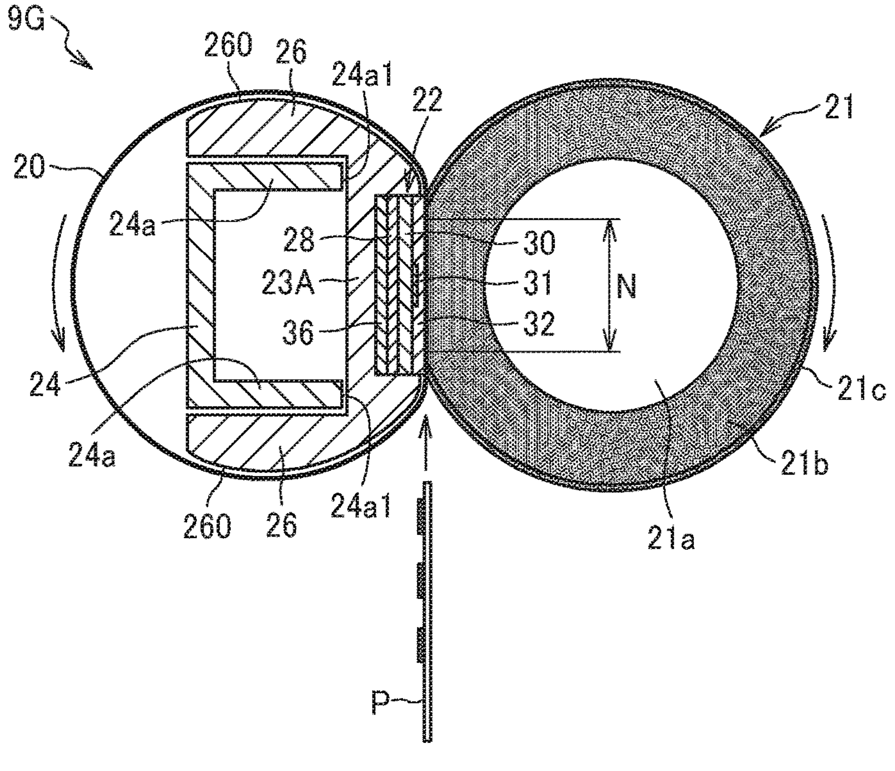
FIG. 23 is a schematic side cross-sectional view of a fixing device according to yet another embodiment of the present disclosure, that is installable in the image forming apparatus depicted in FIG. 1.

As illustrated in FIG. 23, the fixing device 9G according to the embodiment includes second thermal conductors 36 and a heater holder 23A. The second thermal conductors 36 are sandwiched between the heater holder 23A and the first thermal conductor 28. Each of the second thermal conductors 36 is disposed at a position different from a position of the first thermal conductor 28 in a laminating direction (e.g., a horizontal direction in FIG. 23) in which the stay 24, the heater holder 23A, the second thermal conductor 36, the first thermal conductor 28, and the heater 22 are arranged. Specifically, the second thermal conductors 36 are superimposed on the first thermal conductor 28. Unlike FIG. 14 illustrating the fixing device 9C, FIG. 23 illustrates a cross section of the fixing device 9G that intersects the arrangement direction in which the resistive heat generators 31 are arranged and is not provided with the thermistors 25. That is, FIG. 23 illustrates the cross section that is provided with the second thermal conductor 36.

The second thermal conductor 36 is made of a material having a thermal conductivity greater than a thermal conductivity of the base 30. For example, the second thermal conductor 36 is made of graphene or graphite. The fixing device 9G according to the embodiment incorporates the second thermal conductor 36 that is a graphite sheet having a thickness of 1 mm. Alternatively, the second thermal conductor 36 may be a plate made of aluminum, copper, silver, or the like.

Figure 24:
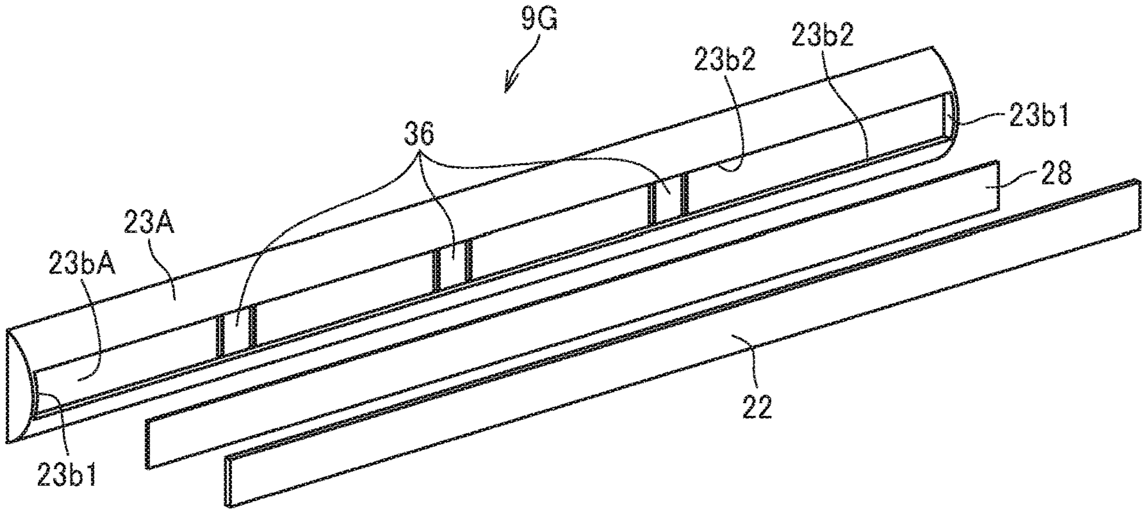
FIG. 24 is a perspective view of the heater, the first thermal conductor, second thermal conductors, and a heater holder incorporated in the fixing device depicted in FIG. 23.

As illustrated in FIG. 24, the plurality of second thermal conductors 36 is arranged on a plurality of parts on the heater holder 23A in a longitudinal direction thereof, respectively. The heater holder 23A includes a recess 23*b*A that includes cavities placed with the second thermal conductors 36, respectively. The cavities are stepped down by one step from other portion of the recess 23*b*A. The second thermal conductor 36 and the heater holder 23A define a gap therebetween at both lateral ends of the second thermal conductor 36 in the longitudinal direction of the heater holder 23A. Thus, the second thermal conductor 36 suppresses conduction of heat from both lateral ends of the second thermal conductor 36 to the heater holder 23A, causing the heater 22 to heat the fixing belt 20 efficiently. FIG. 24 omits illustration of the guide ribs 26 depicted in FIG. 23.

Figure 25:
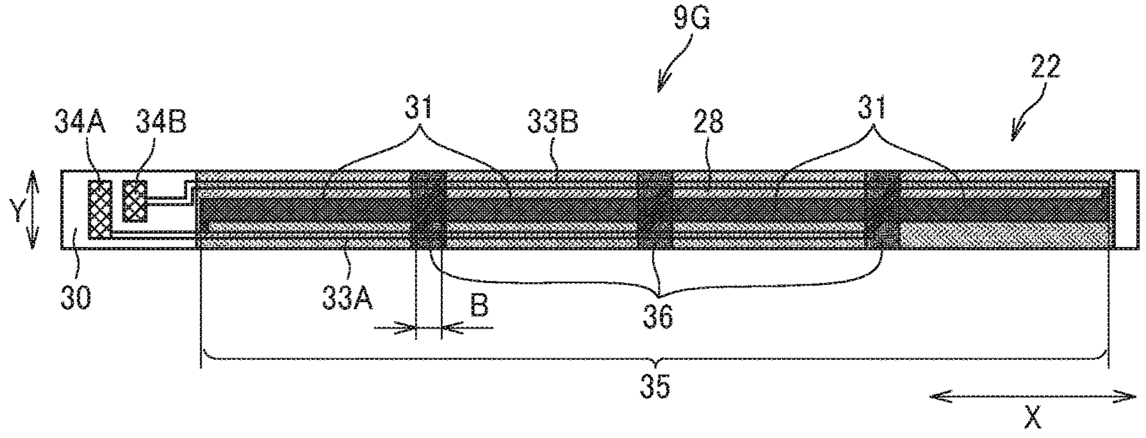
FIG. 25 is a plan view of the heater depicted in FIG. 24, illustrating an arrangement of the first thermal conductor and the second thermal conductors.
Figure 29:
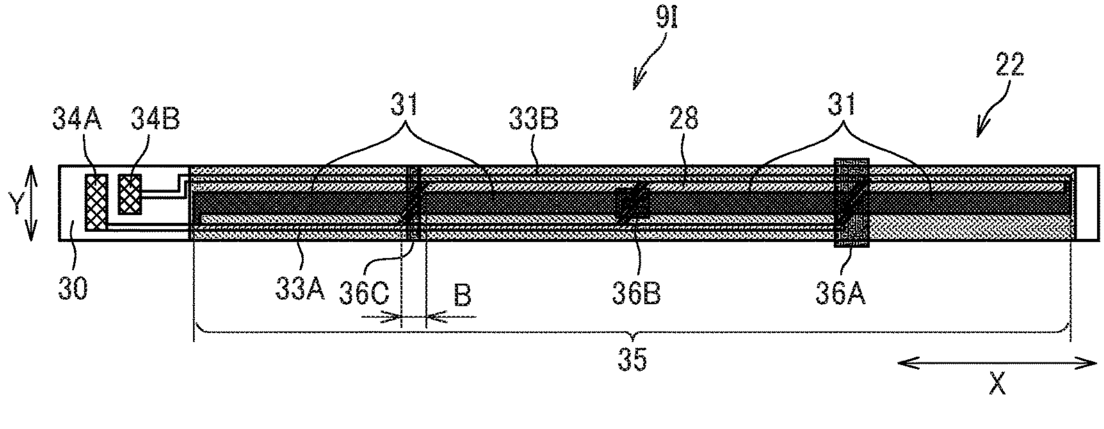
FIG. 29 is a plan view of the heater depicted in FIG. 25, illustrating an arrangement of second thermal conductors as a variation of the second thermal conductors depicted in FIG. 25.

As illustrated in FIG. 25, the second thermal conductor 36 that is hatched is disposed opposite the gap B between the adjacent resistive heat generators 31 and overlaps at least a part of the adjacent resistive heat generators 31 in the longitudinal direction X of the heater 22, that is, the arrangement direction in which the resistive heat generators 31 are arranged. According to the embodiment, the second thermal conductor 36 extends throughout the entire span of the gap B. FIG. 25 and FIG. 29 referred to in a description below illustrate the first thermal conductor 28 that is disposed opposite and spans the heat generation portion 35 in the arrangement direction in which the resistive heat generators 31 are arranged. Alternatively, the first thermal conductor 28 may span differently as described above.

The fixing device 9G according to the embodiment includes, in addition to the first thermal conductor 28, the second thermal conductors 36 each of which is disposed opposite the gap B and overlaps at least a part of the adjacent resistive heat generators 31 in the longitudinal direction X of the heater 22. The second thermal conductors 36 improve efficiency in conduction of heat at the gaps B in the longitudinal direction X of the heater 22 in which the resistive heat generators 31 are arranged, suppressing uneven temperature of the heater 22 in the longitudinal direction X thereof more effectively.

Figure 26:
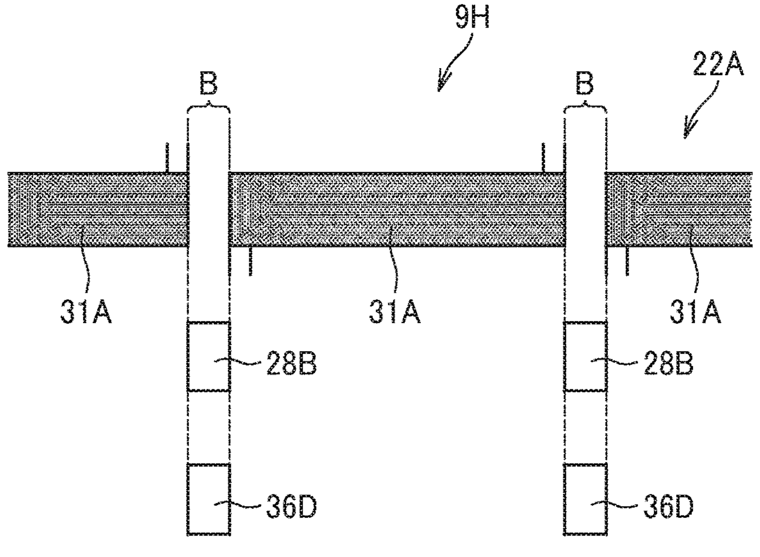
FIG. 26 is a plan view of the heater depicted in FIG. 16, illustrating the first thermal conductor depicted in FIG. 21 and a second thermal conductor that are arranged with an arrangement different from the arrangement depicted in FIG. 25.

FIG. 26 illustrates a fixing device 9H including the first thermal conductors 28B, second thermal conductors 36D, and a heater 22A including the resistive heat generators 31A. The first thermal conductor 28B and the second thermal conductor 36D are preferably disposed opposite the entire span of the gap B in the arrangement direction in which the resistive heat generators 31A are arranged. Accordingly, the first thermal conductor 28B and the second thermal conductor 36D improve efficiency in conduction of heat at the gap B compared to an outboard region of the heater 22A, which is other than the gap B. FIG. 26 illustrates the resistive heat generators 31A shifted from the first thermal conductors 28B and the second thermal conductors 36D vertically in FIG. 26 for convenience. Practically, the resistive heat generators 31A are substantially leveled with the first thermal conductors 28B and the second thermal conductors 36D in the orthogonal direction perpendicular to the arrangement direction in which the resistive heat generators 31A are arranged. Alternatively, the first thermal conductors 28B and the second thermal conductors 36D may be disposed with respect to the resistive heat generators 31A with other arrangement. For example, the first thermal conductor 28B and the second thermal conductor 36D may span a part of the resistive heat generator 31A in the orthogonal direction perpendicular to the arrangement direction in which the resistive heat generators 31A are arranged.

Unlike the embodiment described above, according to an embodiment of the present disclosure, each of a first thermal conductor (e.g., the first thermal conductors 28, 28A, and 28B) and a second thermal conductor (e.g., the second thermal conductors 36 and 36D) is made of a graphene sheet. Hence, each of the first thermal conductor and the second thermal conductor has an enhanced thermal conductivity in a predetermined direction along a surface of the graphene sheet, that is, an arrangement direction in which resistive heat generators (e.g., the resistive heat generators 31 and 31A) are arranged, not a thickness direction of the first thermal conductor and the second thermal conductor. Accordingly, the first thermal conductor and the second thermal conductor suppress uneven temperature of a heater (e.g., the heaters 22 and 22A) and the fixing belt 20 in the arrangement direction effectively.

Figure 27:
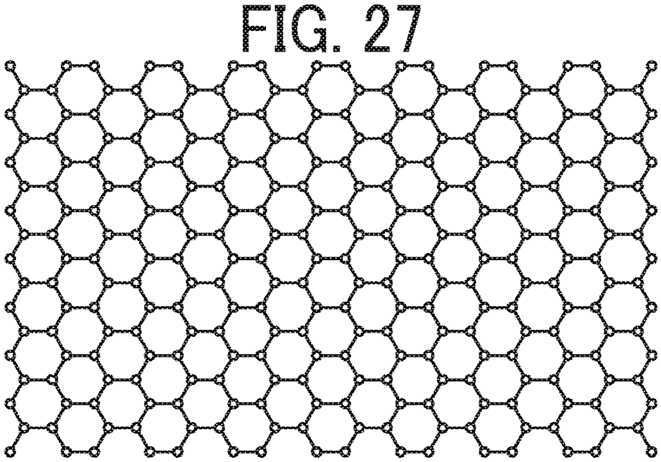
FIG. 27 is a diagram of a crystalline structure of atoms of graphene.

Graphene is thin powder. As illustrated in FIG. 27, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms. The graphene sheet may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene $C_{60}$, $C_{70}$, and $C_{80}$, 3-coordinated carbon atoms, or the like.

The graphene sheet is artificial and is produced by chemical vapor deposition (CVD), for example.

The graphene sheet is commercially available. A size and a thickness of the graphene sheet and a number of layers and the like of the graphite sheet described below are measured with a transmission electron microscope (TEM), for example.

Figure 28:
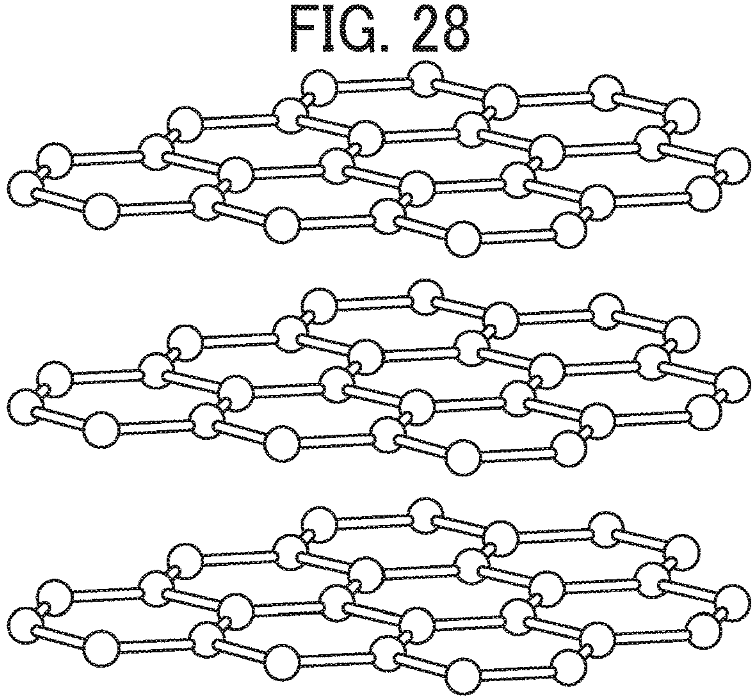
FIG. 28 is a diagram of a crystalline structure of atoms of graphite.

Graphite is constructed of stacked layers of graphene and is highly anisotropic in thermal conduction. As illustrated in FIG. 28, graphite has a plurality of layers, each of which is constructed of hexagonal fused rings of carbon atoms, that are bonded planarly. The plurality of layers defines a crystalline structure. In the crystalline structure, adjacent carbon atoms in the layer are bonded with each other by a covalent bond. Bonding between layers of carbon atoms is established by the van der Waals bond. The covalent bond achieves bonding greater than bonding by the van der Waals bond. Graphite is highly anisotropic with bonding within the layer and bonding between the layers. For example, a first thermal conductor (e.g., the first thermal conductors 28, 28A, 28B, and 28C) or a second thermal conductor (e.g., the second thermal conductors 36 and 36D) is made of graphite. Accordingly, the first thermal conductor or the second thermal conductor attains an efficiency in conduction of heat in an arrangement direction in which resistive heat generators (e.g., the resistive heat generators 31, 31A, 31B, and 31C) are arranged, which is greater than an efficiency in conduction of heat in a thickness direction, for example, the laminating direction in which the stay 24, the heater holder 23A, the second thermal conductor 36, the first thermal conductor 28, and the heater 22 are arranged as illustrated in FIG. 23, thus suppressing conduction of heat to the heater holder 23A. Consequently, the first thermal conductor or the second thermal conductor suppresses uneven temperature of the heater 22 or 22A in the longitudinal direction X thereof efficiently. Additionally, the first thermal conductor or the second thermal conductor minimizes heat conducted to the heater holder 23A. The first thermal conductor or the second thermal conductor that is made of graphite attains enhanced heat resistance that inhibits oxidation at approximately 700 degrees Celsius.

The graphite sheet has a physical property and a dimension that are adjusted properly according to a function of the first thermal conductor or the second thermal conductor. For example, the graphite sheet is made of graphite having enhanced purity or single crystal graphite. The graphite sheet has an increased thickness to enhance anisotropic thermal conduction. In order to perform high speed fixing, the fixing device 9G employs the graphite sheet having a decreased thickness to decrease thermal capacity of the fixing device 9G. If the fixing nip N and the heater 22 have an increased length in the longitudinal direction X thereof, the first thermal conductor 28 or the second thermal conductor 36 also has an increased length in the longitudinal direction X thereof.

In view of increasing mechanical strength, the graphite sheet preferably has a number of layers that is not smaller than 11 layers. The graphite sheet may include a part constructed of a single layer and another part constructed of a plurality of layers.

The second thermal conductor 36 is disposed opposite the gap B and the enlarged gap region C between the adjacent resistive heat generators 31 and overlaps at least a part of the adjacent resistive heat generators 31 in the longitudinal direction X of the heater 22 in which the resistive heat generators 31 are arranged. Hence, the second thermal conductor 36 may be positioned with respect to the resistive heat generators 31 differently from the second thermal conductor 36 depicted in FIG. 25. For example, FIG. 29 illustrates a fixing device 9I including a second thermal conductor 36A that protrudes beyond the base 30 bidirectionally in the orthogonal direction Y perpendicular to the longitudinal direction X of the heater 22. The fixing device 9I further includes a second thermal conductor 36B that is disposed in a span of the resistive heat generator 31 in the orthogonal direction Y. The fixing device 9I further includes a second thermal conductor 36C that spans a part of the gap B.

Figure 30:
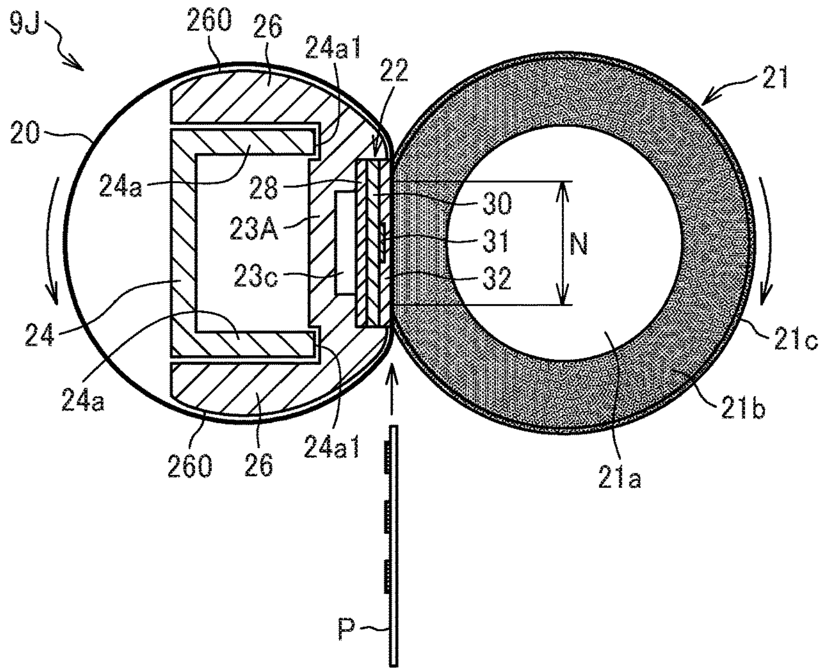
FIG. 30 is a schematic side cross-sectional view of a fixing device according to yet another embodiment of the present disclosure, that is installable in the image forming apparatus depicted in FIG. 1.

FIG. 30 illustrates a fixing device 9J according to an embodiment of the present disclosure that includes a retracted portion 23*c* (e.g., a clearance) that is interposed between the first thermal conductor 28 and the heater holder 23A in a thickness direction of the heater holder 23A (e.g., a horizontal direction in FIG. 30). For example, the retracted portion 23*c* is disposed in a part of the recess 23*b*A of the heater holder 23A depicted in FIG. 24, which accommodates the heater 22, the first thermal conductor 28, and the second thermal conductors 36. A part of the recess 23*b*A is stepped down from other part of the recess 23*b*A, that accommodates the first thermal conductor 28, to produce the retracted portion 23*c* serving as a thermal insulation layer. The retracted portion 23*c* is disposed opposite an outboard portion of the recess 23*b*A, that is outboard from the second thermal conductor 36 in the arrangement direction in which the resistive heat generators 31 are arranged. The retracted portion 23*c* spans a part or an entirety of the outboard portion in the arrangement direction. The retracted portion 23*c* spans a part of the outboard portion in the orthogonal direction perpendicular to the arrangement direction. Accordingly, the heater holder 23A contacts the first thermal conductor 28 with a minimum contact area, thus suppressing conduction of heat from the first thermal conductor 28 to the heater holder 23A and causing the heater 22 to heat the fixing belt 20 efficiently. On a cross section that intersects a longitudinal direction of the fixing device 9J and is provided with the second thermal conductor 36, the second thermal conductor 36 contacts the heater holder 23A as illustrated in FIG. 23 illustrating the fixing device 9G according to the embodiment described above.

According to the embodiment, the retracted portion 23*c* spans an entirety of the resistive heat generator 31 in the orthogonal direction (e.g., a vertical direction in FIG. 30) perpendicular to the arrangement direction of the resistive heat generators 31 of the heater 22. Thus, the retracted portion 23*c* suppresses conduction of heat from the first thermal conductor 28 to the heater holder 23A, causing the heater 22 to heat the fixing belt 20 efficiently. Alternatively, instead of the retracted portion 23*c* that defines the clearance, the fixing device 9J may incorporate a thermal insulator that has a thermal conductivity smaller than a thermal conductivity of the heater holder 23A, as the thermal insulation layer.

According to the embodiments described above, the second thermal conductor 36 is provided separately from the first thermal conductor 28. Alternatively, the fixing device 9J may have other configuration. For example, the first thermal conductor 28 may include an opposed portion that is disposed opposite the gap B and has a thickness greater than a thickness of an outboard portion of the first thermal conductor 28, which is other than the opposed portion.

Figure 31:
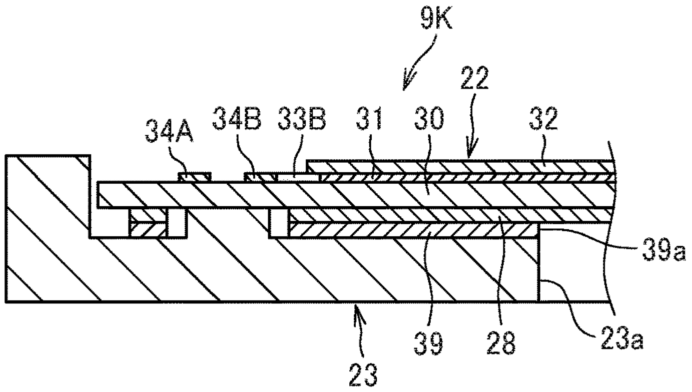
FIG. 31 is a partial cross-sectional view of a fixing device according to yet another embodiment of the present disclosure, that is installable in the image forming apparatus depicted in FIG. 1, illustrating the first thermal conductor interposed between a thermal insulator and the heater.

FIG. 31 illustrates a fixing device 9K incorporating a thermal insulator 39 that is interposed between the first thermal conductor 28 and the heater holder 23. In the fixing device 9K depicted in FIG. 31, the thermistor 25 is disposed opposite the first thermal conductor 28 via the opening 23*a* of the heater holder 23 and an opening 39*a* of the thermal insulator 39.

According to the embodiments depicted in FIGS. 23, 30, and 31 also, like in the embodiments described above, each of the fixing devices 9G, 9J, and 9K includes a lateral end thermistor (e.g., the lateral end thermistors 25A, 25AA, and 25AB) and a center thermistor (e.g., the center thermistors 25B, 25BA, and 25BB) that contact the first thermal conductor 28 or the second thermal conductor 36. Additionally, a sheet sensor (e.g., the sheet sensors 29, 29A, and 29B) is disposed upstream from the fixing device 9G, 9J, or 9K in the sheet conveyance direction DP. Thus, each of the fixing devices 9G, 9J, and 9K detects and overcomes failure as the first disadvantage, the second disadvantage, and the third disadvantage like in the embodiments described above. For example, the lateral end thermistor, the center thermistor, and the sheet sensor detect an erroneous size of a sheet P, that is different from a preset size, and shifting of the sheet P, thus preventing temperature increase of the lateral end span of the fixing belt 20 in the longitudinal direction thereof. The lateral end thermistor detects uneven temperature of the lateral end span of the fixing belt in the longitudinal direction thereof. Accordingly, each of the fixing devices 9G, 9J, and 9K prevents temperature increase of the lateral end span of the rotator (e.g., the fixing belt 20) in the longitudinal direction thereof and resultant breakage of the rotator at reduced costs. Additionally, each of the fixing devices 9G, 9J, and 9K suppresses uneven temperature of the lateral end span of the rotator in the longitudinal direction thereof.

The above describes the embodiments of the present disclosure. However, the technology of the present disclosure is not limited to the embodiments described above and is modified within the scope of the present disclosure.

Figure 32:
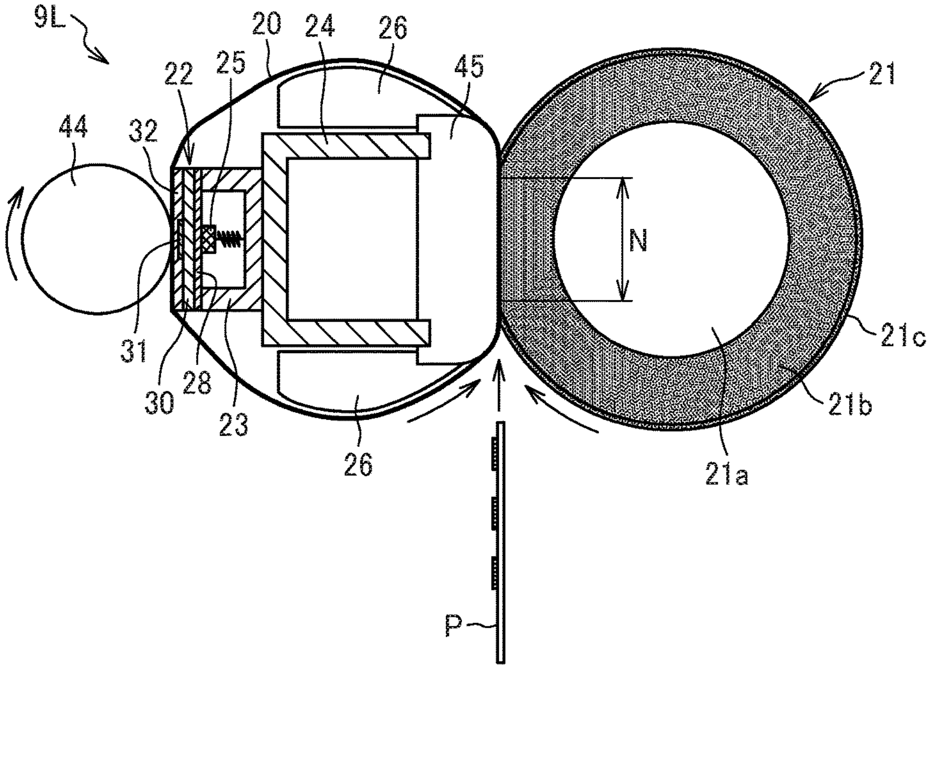
FIG. 32 is a schematic side cross-sectional view of a fixing device according to yet another embodiment of the present disclosure, that is installable in the image forming apparatus depicted in FIG. 1.
Figure 33:
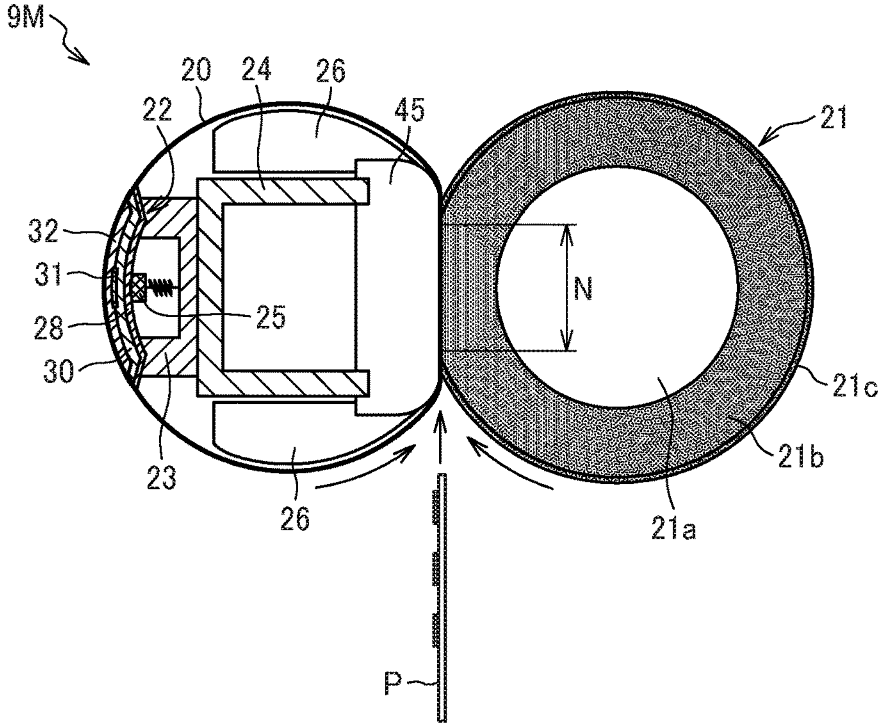
FIG. 33 is a schematic side cross-sectional view of a fixing device according to yet another embodiment of the present disclosure, that is installable in the image forming apparatus depicted in FIG. 1.
Figure 34:
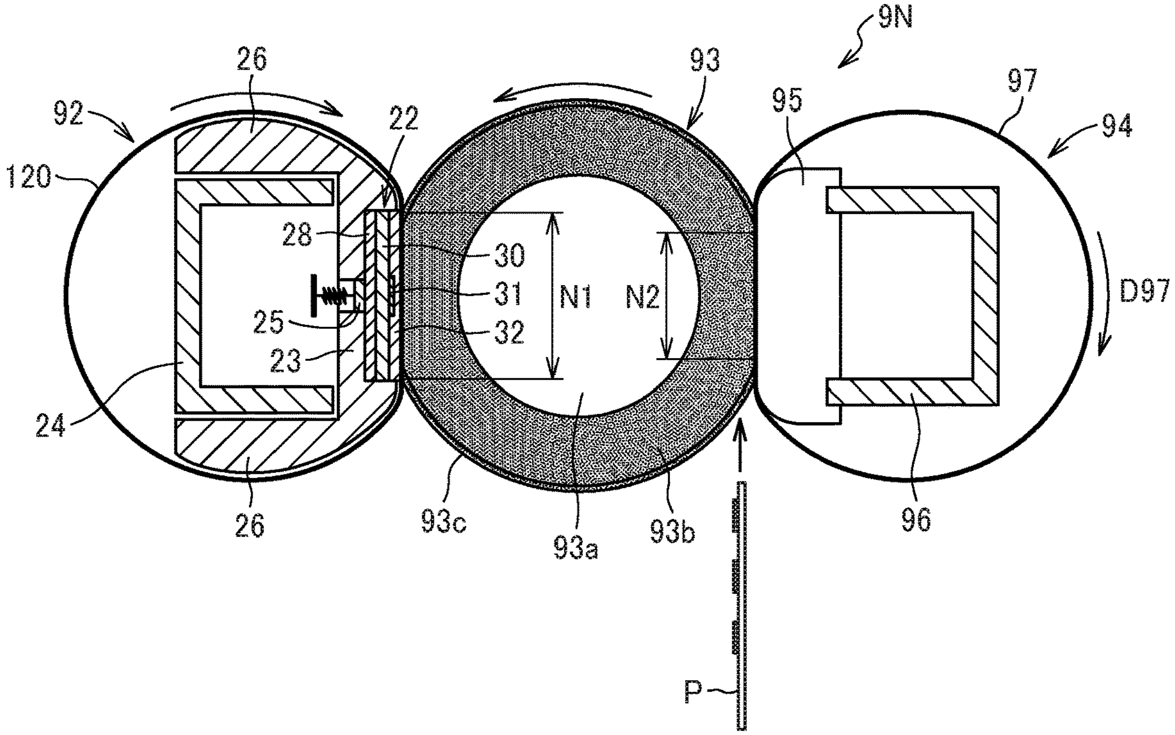
FIG. 34 is a schematic side cross-sectional view of a fixing device according to yet another embodiment of the present disclosure, that is installable in the image forming apparatus depicted in FIG. 1.

The embodiments of the present disclosure are also applied to fixing devices 9L, 9M, and 9N illustrated in FIGS. 32, 33, and 34, respectively, other than the fixing device 9 described above. The following briefly describes a construction of each of the fixing devices 9L, 9M, and 9N illustrated in FIGS. 32, 33, and 34, respectively.

FIG. 32 illustrates the fixing device 9L that includes a pressing roller 44 disposed opposite the pressure roller 21 via the fixing belt 20. The pressing roller 44 serves as an opposed rotator disposed opposite the fixing belt 20 serving as the rotator. The pressing roller 44 rotates in accordance with rotation of the fixing belt 20. The pressing roller 44 and the heater 22 sandwich the fixing belt 20 so that the heater 22 heats the fixing belt 20. Within the loop formed by the fixing belt 20 is a nip formation pad 45 that is disposed opposite the pressure roller 21 via the fixing belt 20. The stay 24 supports the nip formation pad 45. The nip formation pad 45 and the pressure roller 21 sandwich the fixing belt 20 and form the fixing nip N.

FIG. 33 illustrates the fixing device 9M that does not incorporate the pressing roller 44 described above with reference to FIG. 32. In order to attain a contact length for which the heater 22 contacts the fixing belt 20 in the circumferential direction thereof, the heater 22 is curved into an arc in cross section that corresponds to a curvature of the fixing belt 20. Other construction of the fixing device 9M is equivalent to the construction of the fixing device 9L depicted in FIG. 32.

FIG. 34 illustrates the fixing device 9N that includes a heating assembly 92, a fixing roller 93 serving as a pressure rotator, and a pressure assembly 94 serving as an opposed rotator. The heating assembly 92 includes the heater 22, the first thermal conductor 28, the heater holder 23, and the stay 24 that are described in the embodiments above and a heating belt 120 serving as a rotator. The fixing roller 93 serves as an opposed rotator that is disposed opposite the heating belt 120 serving as the rotator and rotates. The fixing roller 93 includes a core metal 93*a* that is solid and made of iron, an elastic layer 93*b* that is disposed on a surface of the core metal 93*a*, and a release layer 93*c* that coats an outer surface of the elastic layer 93*b*. The pressure assembly 94 is disposed opposite the heating assembly 92 via the fixing roller 93. The pressure assembly 94 includes a nip formation pad 95, a stay 96, and a pressure belt 97. The pressure belt 97 rotates and is formed into a loop within which the nip formation pad 95 and the stay 96 are disposed. The heating belt 120 and the fixing roller 93 define a heating nip N1 therebetween. The pressure belt 97 and the fixing roller 93 define a fixing nip N2 therebetween. As a sheet P is conveyed through the fixing nip N2, the fixing roller 93 heated at the heating nip N1 and the pressure belt 97 fix a toner image formed on the sheet P thereon under heat and pressure. The pressure belt 97 rotates in a rotation direction D97.

Each of the fixing devices 9L, 9M, and 9N depicted in FIGS. 32, 33, and 34, respectively, also includes a lateral end thermistor (e.g., the lateral end thermistors 25A, 25AA, and 25AB) and a center thermistor (e.g., the center thermistors 25B, 25BA, and 25BB). A sheet sensor (e.g., the sheet sensors 29, 29A, and 29B) is disposed upstream from each of the fixing devices 9L, 9M, and 9N in the sheet conveyance direction DP. Thus, each of the fixing devices 9L, 9M, and 9N detects and overcomes failure as the first disadvantage, the second disadvantage, and the third disadvantage like in the embodiments described above. For example, the lateral end thermistor, the center thermistor, and the sheet sensor detect an erroneous size of a sheet P, that is different from a preset size, and shifting of the sheet P, thus preventing temperature increase of the lateral end span of the rotator (e.g., the fixing belt 20 and the heating belt 120) in the longitudinal direction thereof. The lateral end thermistor detects uneven temperature of the lateral end span of the rotator in the longitudinal direction thereof. Accordingly, each of the fixing devices 9L, 9M, and 9N prevents temperature increase of the lateral end span of the rotator in the longitudinal direction thereof and resultant breakage of the rotator at reduced costs. Additionally, each of the fixing devices 9L, 9M, and 9N suppresses uneven temperature of the lateral end span of the rotator in the longitudinal direction thereof.

A heating device that is disposed in a conveyance device applied with the technology of the present disclosure and incorporates a first temperature detector and a second temperature detector is not limited to a fixing device (e.g., the fixing devices 9, 9A, 9B, 9C, 9D, 9E, 9F, 9G, 9H, 9I, 9J, 9K, 9L, 9M, and 9N) according to the embodiments described above. For example, the technology of the present disclosure is also applied to a heating device such as a dryer that dries ink applied onto a sheet. Further, the technology of the present disclosure is also applied to a heating device such as a thermocompression bonding device including a laminator and a heat sealer. The laminator bonds film as a coating member onto a surface of a sheet by thermocompression. The heat sealer bonds sealing portions of a packaging material by thermocompression. As the technology of the present disclosure is also applied to the conveyance device incorporating the heating device, the conveyance device prevents temperature increase of the lateral end span of the rotator (e.g., the fixing belt 20) in the longitudinal direction thereof and resultant breakage of the rotator at reduced costs. Additionally, each of the fixing devices 9L, 9M, and 9N suppresses uneven temperature of the lateral end span of the rotator in the longitudinal direction thereof.

Application of the technology of the present disclosure is not limited to the color image forming apparatus 100 depicted in FIG. 1 that forms a color toner image. The technology of the present disclosure is also applied to a monochrome image forming apparatus that forms a monochrome toner image, a copier, a printer, a facsimile machine, a multifunction peripheral (MFP) having at least two of copying, printing, facsimile, scanning, and plotter functions, or the like.

Figure 35:
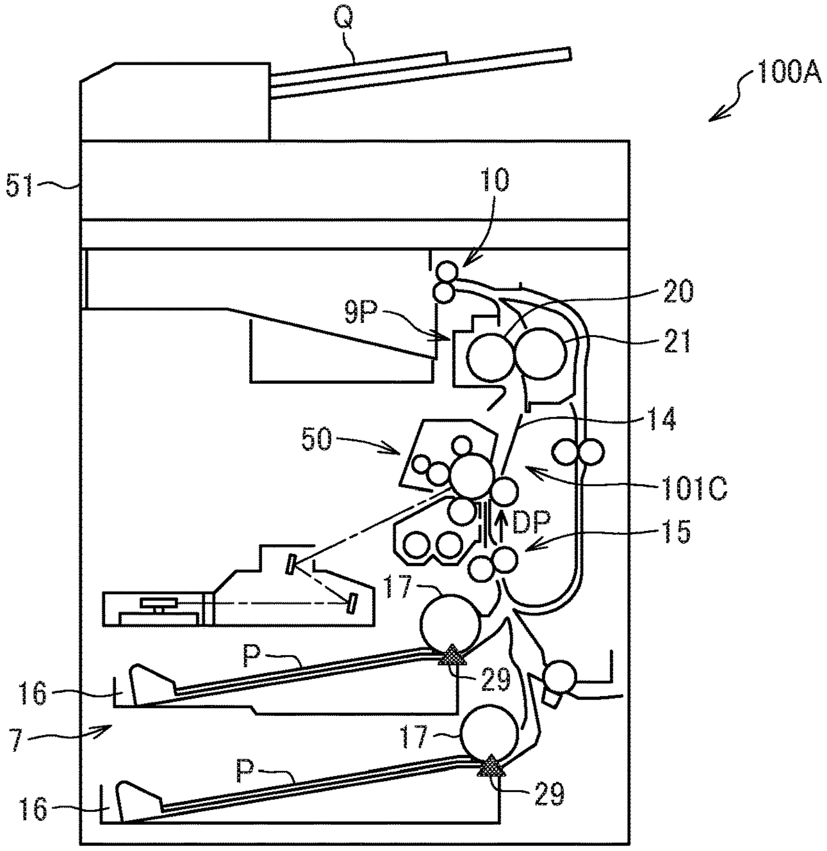
FIG. 35 is a schematic cross-sectional view of an image forming apparatus according to another embodiment of the present disclosure that is different from the image forming apparatus depicted in FIG. 1.

For example, FIG. 35 illustrates an image forming apparatus 100A according to an embodiment of the present disclosure. The image forming apparatus 100A includes an image forming device 50 including a photoconductive drum, a sheet conveyor including the timing roller pair 15, the sheet feeder 7, a fixing device 9P, the output device 10, and a scanner 51. The sheet feeder 7 includes a plurality of sheet trays 16 each of which is provided with the sheet sensor 29 and the feed roller 17. The sheet trays 16 load a plurality of sheets P having different sizes, respectively.

According to the embodiment, the sheet sensors 29 are disposed inside the sheet trays 16, respectively. Alternatively, the sheet sensor 29 may be disposed on the sheet conveyance path 14 at a position in proximity to and upstream from the timing roller pair 15 in the sheet conveyance direction DP.

The scanner 51 reads an image on an original Q into image data. The sheet feeder 7 loads the plurality of sheets P and feeds the sheets P to the sheet conveyance path 14 one by one. The timing roller pair 15 conveys the sheet P conveyed through the sheet conveyance path 14 to the image forming device 50.

The image forming device 50 forms a toner image on the sheet P. For example, the image forming device 50 includes the photoconductive drum, a charging roller, an exposure device, a developing device, a replenishing device, a transfer roller, a cleaner, and a discharger. The toner image is a reproduction of the image on the original Q, for example. The fixing device 9P fixes the toner image on the sheet P under heat and pressure. The sheet P bearing the fixed toner image is conveyed to the output device 10 by a conveyance roller and the like. The output device 10 ejects the sheet P onto an outside of the image forming apparatus 100A. The image forming apparatus 100A includes a conveyance device 101C that includes the sheet feeder 7, the sheet sensor 29, the sheet conveyance path 14, and the fixing device 9P.

A description is provided of a construction of the fixing device 9P according to an embodiment of the present disclosure.

A description of elements of the fixing device 9P, which are common to the fixing device 9 depicted in FIG. 2, is omitted properly.

Figure 36:
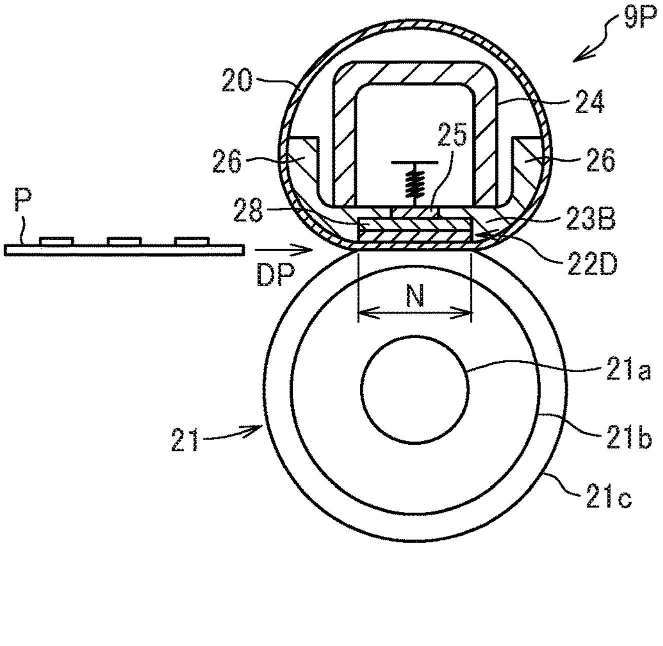
FIG. 36 is a schematic side cross-sectional view of a fixing device according to yet another embodiment of the present disclosure, that is incorporated in the image forming apparatus depicted in FIG. 35.

As illustrated in FIG. 36, the fixing device 9P includes the fixing belt 20, the pressure roller 21, a heater 22D, a heater holder 23B, the stay 24, the thermistors 25, the guide ribs 26, and the first thermal conductor 28.

The fixing belt 20 and the pressure roller 21 define the fixing nip N therebetween. The fixing nip N has a nip length of 10 mm in the sheet conveyance direction DP. The fixing belt 20 and the pressure roller 21 convey the sheet P at a linear velocity of 240 mm/s.

The fixing belt 20 includes the base layer made of polyimide and the release layer and does not include an elastic layer. The release layer is heat-resistant film made of fluororesin, for example. The fixing belt 20 has an outer diameter of approximately 24 mm.

The pressure roller 21 includes the core metal 21*a*, the elastic layer 21*b*, and the release layer 21*c*. The pressure roller 21 has an outer diameter in a range of from 24 mm to 30 mm. The elastic layer 21*b* has a thickness in a range of from 3 mm to 4 mm.

Figure 37:
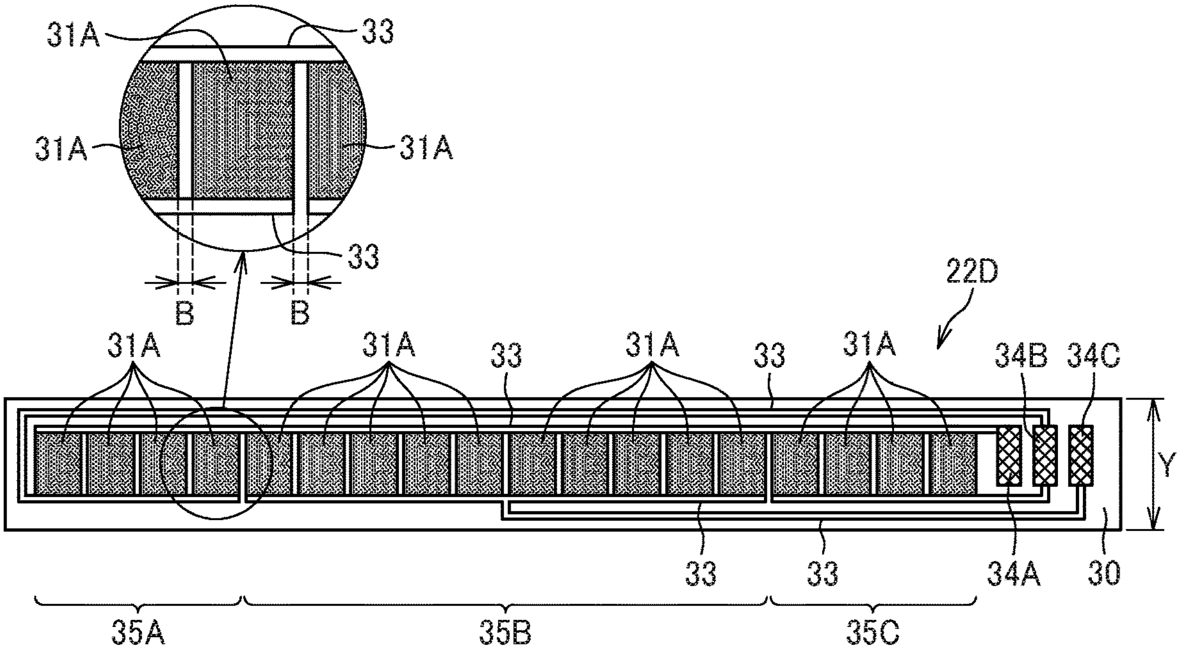
FIG. 37 is a plan view of a heater incorporated in the fixing device depicted in FIG. 36.

As illustrated in FIG. 37, the heater 22D includes the base 30, a thermal insulation layer, a conductor layer including the resistive heat generators 31A, and an insulating layer. The heater 22D has a total thickness of 1 mm. The heater 22D has a width of 13 mm in the orthogonal direction Y perpendicular to the arrangement direction in which the resistive heat generators 31A are arranged.

As illustrated in FIG. 37, the conductor layer of the heater 22D includes the plurality of resistive heat generators 31A, the feeders 33, the electrodes 34A and 34B, and an electrode 34C. According to the embodiment also, as illustrated in an enlarged view in FIG. 37, the gap B serving as the dividing region is interposed between the adjacent resistive heat generators 31A in the arrangement direction in which the resistive heat generators 31A are arranged. FIG. 37 illustrates the two gaps B in the enlarged view. However, the gap B is disposed at each interval between the adjacent resistive heat generators 31A depicted in FIG. 37. The heater 22D further includes three heat generation portions 35A, 35B, and 35C each of which is constructed of the resistive heat generators 31A. As the electrodes 34A and 34B are energized, the heat generation portions 35A and 35C generate heat. As the electrodes 34A and 34C are energized, the heat generation portion 35B generates heat. For example, in order to fix a toner image on a sheet P having a decreased size not greater than a predetermined size, the heat generation portion 35B generates heat. In order to fix a toner image on a sheet P having an increased size greater than the predetermined size, the heat generation portions 35A, 35B, and 35C generate heat.

Figure 38:
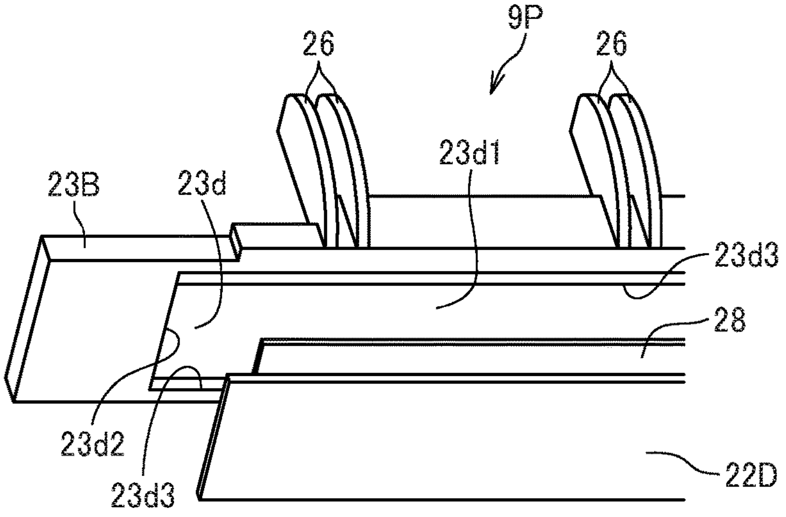
FIG. 38 is a perspective view of the heater depicted in FIG. 37 and a heater holder incorporated in the fixing device depicted in FIG. 36.

As illustrated in FIG. 38, the heater holder 23B includes a recess 23*d* that holds the heater 22D and the first thermal conductor 28. The recess 23*d* is disposed on a heater opposed face of the heater holder 23B, that is disposed opposite the heater 22D. The recess 23*d* includes a bottom face 23*d*1 and walls 23*d*2 and 23*d*3. The bottom face 23*d*1 is substantially parallel to the base 30 and recessed with respect to the heater 22D compared to other faces of the heater holder 23B. The wall 23*d*2 is disposed at at least one of both lateral ends of the heater holder 23B in the arrangement direction in which the resistive heat generators 31A are arranged and serves as an interior wall of the heater holder 23B. The walls 23*d*3 are disposed at both ends of the heater holder 23B in the orthogonal direction Y depicted in FIG. 37 perpendicular to the arrangement direction and serve as interior walls of the heater holder 23B, respectively. The heater holder 23B mounts the guide ribs 26. The heater holder 23B is made of LCP.

Figure 39:
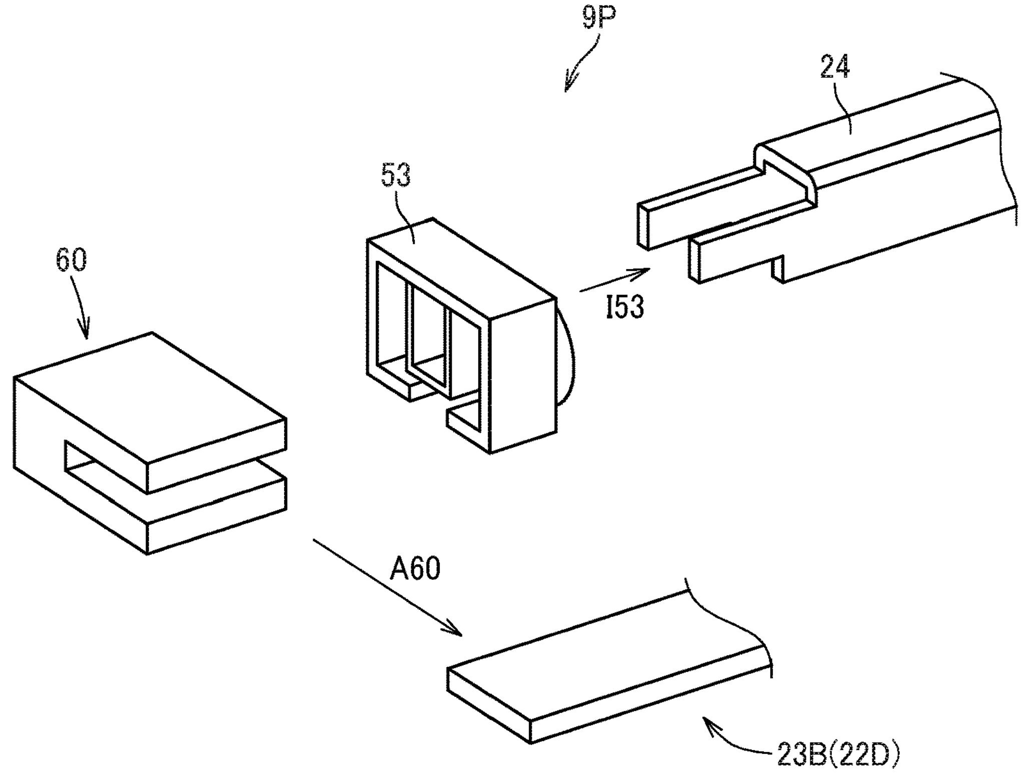
FIG. 39 is a perspective view of the heater depicted in FIG. 38 and a connector to be attached to the heater.

As illustrated in FIG. 39, the fixing device 9P further includes a connector 60 that includes a housing made of resin such as LCP and a plurality of contact terminals disposed in the housing.

The connector 60 is attached to the heater 22D and the heater holder 23B such that the connector 60 sandwiches the heater 22D and the heater holder 23B together at a front face and a back face of the heater 22D and the heater holder 23B. In a state in which the connector 60 sandwiches and holds the heater 22D and the heater holder 23B, as the contact terminals of the connector 60 contact and press against the electrodes 34A, 34B, and 34C of the heater 22D, the heat generation portions 35A, 35B, and 35C are electrically connected to a power supply disposed in the image forming apparatus 100A through the connector 60. Thus, the power supply is ready to supply power to the heat generation portions 35A, 35B, and 35C. At least a part of each of the electrodes 34A, 34B, and 34C is not coated with the insulating layer and is exposed so that each of the electrodes 34A, 34B, and 34C is coupled with the connector 60.

The fixing device 9P further includes a flange 53 that is disposed opposite each lateral end of the fixing belt 20 in the longitudinal direction thereof. The flange 53 contacts the inner circumferential face of the fixing belt 20 and holds or supports the fixing belt 20 at each lateral end of the fixing belt 20 in the longitudinal direction thereof. The flanges 53 are secured to a frame of the fixing device 9P. The flange 53 is inserted into each lateral end of the stay 24 in the longitudinal direction thereof in an insertion direction 153 illustrated in FIG. 39.

The connector 60 is attached to the heater 22D and the heater holder 23B in an attachment direction A60 illustrated in FIG. 39 that is parallel to the orthogonal direction Y perpendicular to the arrangement direction in which the resistive heat generators 31A are arranged as illustrated in FIG. 37. Alternatively, in order to attach the connector 60 to the heater holder 23B, one of the connector 60 and the heater holder 23B may include a projection that engages a recess disposed in another one of the connector 60 and the heater holder 23B such that the projection moves inside the recess relatively. The connector 60 is attached to one lateral end of the heater 22D and the heater holder 23B in the arrangement direction in which the resistive heat generators 31A are arranged. The one lateral end of the heater 22D and the heater holder 23B is opposite to another lateral end of the heater 22D and the heater holder 23B with which the driver (e.g., a motor) that drives the pressure roller 21 is coupled.

Figure 40:
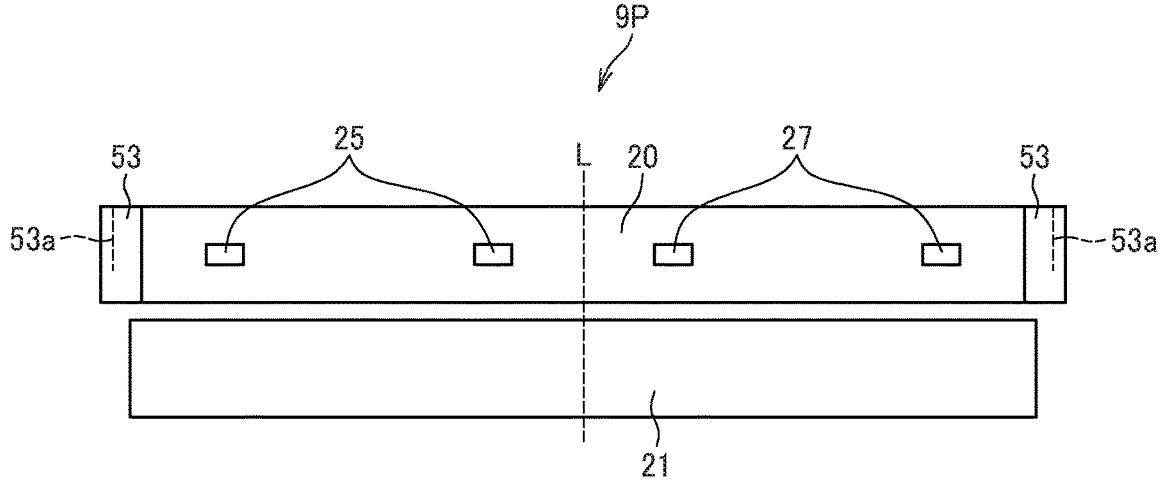
FIG. 40 is a diagram of thermistors, thermostats, and flanges incorporated in the fixing device depicted in FIG. 36, illustrating an arrangement of the thermistors and the thermostats.

As illustrated in FIG. 40, the thermistors 25 are disposed opposite the inner circumferential face of the fixing belt 20 at a position in proximity to a center line L and a position in one lateral end span of the fixing belt 20 in the longitudinal direction thereof, respectively. The controller 220 depicted in FIG. 4 controls the heater 22D based on a temperature of the fixing belt 20, that is detected by the thermistor 25 disposed at the position in proximity to the center line L, and a temperature of the fixing belt 20, that is detected by the thermistor 25 disposed opposite the one lateral end span of the fixing belt 20 in the longitudinal direction thereof, respectively.

The thermostats 27 are disposed opposite the inner circumferential face of the fixing belt 20 at a position in proximity to the center line L and a position in another lateral end span of the fixing belt 20 in the longitudinal direction thereof, respectively. If the thermostat 27 detects a temperature of the fixing belt 20, that is higher than a preset threshold, the thermostat 27 breaks power to the heater 22D.

The flanges 53 contact and support both lateral ends of the fixing belt 20 in the longitudinal direction thereof, respectively. Each of the flanges 53 is made of LCP.

Figure 41:
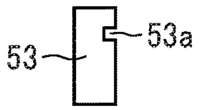
FIG. 41 is a diagram of the flange depicted in FIG. 40, illustrating a slide groove of the flange.

As illustrated in FIG. 41, the flange 53 includes a slide groove 53*a*. The slide groove 53*a* extends in a contact-separation direction in which the fixing belt 20 comes into contact with and separates from the pressure roller 21. The slide groove 53*a* engages an engagement mounted on the frame of the fixing device 9P. As the engagement moves relatively inside the slide groove 53*a*, the fixing belt 20 moves in the contact-separation direction with respect to the pressure roller 21.

Also in the fixing device 9P, like in the embodiments described above, the fixing device 9P includes a lateral end thermistor (e.g., the lateral end thermistors 25A, 25AA, and 25AB) and a center thermistor (e.g., the center thermistors 25B, 25BA, and 25BB) that contact the first thermal conductor 28 or the second thermal conductor 36. Additionally, a sheet sensor (e.g., the sheet sensors 29, 29A, and 29B) is disposed upstream from the fixing device 9P in the sheet conveyance direction DP. Thus, the fixing device 9P detects and overcomes failure as the first disadvantage, the second disadvantage, and the third disadvantage like in the embodiments described above. For example, the lateral end thermistor, the center thermistor, and the sheet sensor detect an erroneous size of a sheet P, that is different from a preset size, and shifting of the sheet P, thus preventing temperature increase of the lateral end span of the fixing belt 20 in the longitudinal direction thereof. The lateral end thermistor detects uneven temperature of the lateral end span of the fixing belt in the longitudinal direction thereof. Accordingly, the fixing device 9P prevents temperature increase of the lateral end span of the rotator (e.g., the fixing belt 20) in the longitudinal direction thereof and resultant breakage of the rotator at reduced costs. Additionally, the fixing device 9P suppresses uneven temperature of the lateral end span of the rotator in the longitudinal direction thereof.

The recording media include, in addition to plain paper as a sheet P, thick paper, a postcard, an envelope, thin paper, coated paper, art paper, tracing paper, an overhead projector (OHP) transparency, plastic film, prepreg, and copper foil.

In the present disclosure, detecting and sensing are synonymous terms.

A description is provided of aspects of the embodiments of the present disclosure.

A description is provided of a first aspect of the embodiments of the present disclosure.

As illustrated in FIGS. 7, 11, 12, and 13, a conveyance device (e.g., the conveyance devices 101, 101A, and 101B) includes a heating device (e.g., the fixing devices 9, 9A, 9B, 9C, 9D, 9E, 9F, 9G, 9H, 9I, 9J, 9K, 9L, 9M, 9N, and 9P) and a recording medium detector (e.g., the sheet sensors 29, 29A, and 29B). The heating device includes a heater (e.g., the heaters 22, 22A, 22B, 22C, and 22D), a first temperature detector (e.g., the lateral end thermistors 25A, 25AA, and 25AB), a second temperature detector (e.g., the center thermistors 25B, 25BA, and 25BB), a rotator, that is, a first rotator, (e.g., the fixing belt 20 and the heating belt 120), and a pressure rotator, that is, a second rotator, (e.g., the pressure roller 21 and the fixing roller 93).

The heater heats a recording medium (e.g., the sheets P, P1, P2, and P3) through the rotator. Each of the first temperature detector and the second temperature detector detects a temperature of the heater. The heater heats the rotator. The pressure rotator includes an elastic layer (e.g., the elastic layer 21*b*). The pressure rotator presses against the rotator. The recording medium detector detects the recording medium. The conveyance device conveys the recording medium in a recording medium conveyance direction (e.g., the sheet conveyance direction DP).

The recording medium conveyance direction is perpendicular to an orthogonal direction (e.g., the longitudinal direction X) that extends along a surface of the recording medium.

The first temperature detector is separated from a center position (e.g., the center position D0) of the elastic layer of the pressure rotator farther than the second temperature detector is in the orthogonal direction. The first temperature detector is separated from the center position of the elastic layer of the pressure rotator for a first length (e.g., the length L1) in the orthogonal direction. The first temperature detector is disposed in a first span (e.g., the first span S1) that is defined by the center position in the orthogonal direction.

The recording medium detector is disposed in a second span (e.g., the second span S2) that is defined by the center position in the orthogonal direction and is opposite to the first span. The recording medium detector is separated from the center position of the elastic layer of the pressure rotator for a second length (e.g., the length L2) in the orthogonal direction.

The first length is greater than the second length.

The recording medium detector is disposed in a minimum recording medium conveyance span (e.g., the sheet conveyance span E1) where the recording medium having a minimum width in the orthogonal direction, that is available in the conveyance device, is conveyed.

A description is provided of a second aspect of the embodiments of the present disclosure.

In the conveyance device according to the first aspect, the second temperature detector is disposed in the minimum recording medium conveyance span where the recording medium having the minimum width in the orthogonal direction, that is available in the conveyance device, is conveyed. The second temperature detector is disposed in the first span that is defined by the center position in the orthogonal direction. The center position defines a center position of a heating span (e.g., the heating span D) of the heater in the orthogonal direction. The first span is opposite to the second span where the recording medium detector is disposed. The second temperature detector is separated from the center position for a third length (e.g., the length L3) in the orthogonal direction.

A description is provided of a third aspect of the embodiments of the present disclosure.

In the conveyance device according to the second aspect, the second length is combined with the third length to define a combined length (e.g., the combined length L4) in the orthogonal direction. The combined length is greater than a half of the minimum width of the recording medium, that is available in the conveyance device.

A description is provided of a fourth aspect of the embodiments of the present disclosure.

In the conveyance device according to the second aspect or the third aspect, the third length is greater than the second length in the orthogonal direction.

A description is provided of a fifth aspect of the embodiments of the present disclosure.

In the conveyance device according to the second aspect or the third aspect, the second length is greater than the third length in the orthogonal direction.

A description is provided of a sixth aspect of the embodiments of the present disclosure.

In the conveyance device according to any one of the first aspect to the fifth aspect, the rotator does not include an elastic layer.

A description is provided of a seventh aspect of the embodiments of the present disclosure.

The conveyance device according to any one of the first aspect to the sixth aspect further includes a recording medium conveyance path (e.g., the sheet conveyance path 14) where the recording medium is conveyed. The recording medium detector is disposed in the recording medium conveyance path and disposed upstream from the heater in the recording medium conveyance direction.

A description is provided of an eighth aspect of the embodiments of the present disclosure.

The conveyance device according to any one of the first aspect to the seventh aspect further includes a recording medium supply (e.g., the sheet feeder 7) that loads the recording medium and supplies the recording medium to the recording medium conveyance path. The recording medium detector is disposed in the recording medium supply.

A description is provided of a ninth aspect of the embodiments of the present disclosure.

An image forming apparatus (e.g., the image forming apparatuses 100 and 100A) includes the conveyance device according to any one of the first aspect to the eighth aspect.

Accordingly, the conveyance device prevents temperature increase of a lateral end span of the rotator in a longitudinal direction thereof and resultant breakage of the rotator at reduced costs. Additionally, the conveyance device suppresses uneven temperature of the lateral end span of the rotator in the longitudinal direction thereof.

According to the embodiments described above, the fixing belt 20 serves as a rotator. Alternatively, a fixing film, a fixing sleeve, or the like may be used as a rotator. Further, the pressure roller 21 serves as a pressure rotator. Alternatively, a pressure belt or the like may be used as a pressure rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A conveyance device comprising:
- a first rotator configured to convey a recording medium in a recording medium conveyance direction;
- a heater configured to heat the first rotator;
- temperature detectors consisting of a first temperature detector configured to detect a temperature of the heater at a first position, and a second temperature detector configured to detect a temperature of the heater at a second position;
- a second rotator configured to press against the first rotator, the second rotator including an elastic layer; and
- a recording medium detector consisting of a first detector configured to detect the recording medium, a total number of the first detector being less than a number of the temperature detectors,
- the first temperature detector being separated from a center position of the elastic layer of the second rotator farther than the second temperature detector is in an orthogonal direction perpendicular to the recording medium conveyance direction,
- the first temperature detector being separated from the center position for a first length in the orthogonal direction,
- the first temperature detector being disposed in a first span that is defined by the center position in the orthogonal direction,
- the first detector being disposed in a second span that is defined by the center position in the orthogonal direction and is opposite to the first span,
- the first detector being separated from the center position for a second length smaller than the first length in the orthogonal direction,
- the first detector being disposed in a minimum recording medium conveyance span where the recording medium having a minimum width in the orthogonal direction is conveyed, the minimum width being available in the conveyance device.

2. The conveyance device according to claim 1,
wherein the orthogonal direction extends along a surface of the recording medium.

3. The conveyance device according to claim 1,
- wherein the second temperature detector is disposed in the minimum recording medium conveyance span,
- wherein the second temperature detector is disposed in the first span, and
- wherein the second temperature detector is separated from the center position for a third length in the orthogonal direction.

4. The conveyance device according to claim 3, wherein the second length is combined with the third length to define a combined length in the orthogonal direction, the combined length being greater than a half of the minimum width of the recording medium.

5. The conveyance device according to claim 3, wherein the third length is greater than the second length.

6. The conveyance device according to claim 3, wherein the second length is greater than the third length.

7. The conveyance device according to claim 1, wherein the first rotator does not include an elastic layer.

8. The conveyance device according to claim 1, further comprising a recording medium conveyance path where the recording medium is conveyed, wherein the first detector is disposed in the recording medium conveyance path and disposed upstream from the heater in the recording medium conveyance direction.

9. The conveyance device according to claim 8, further comprising a recording medium supply configured to load the recording medium and supply the recording medium to the recording medium conveyance path, wherein the first detector is disposed in the recording medium supply.

10. The conveyance device according to claim 1, wherein the second temperature detector is disposed opposite the center position of the elastic layer of the second rotator in the orthogonal direction.

11. The conveyance device according to claim 1, wherein the first temperature detector includes a thermistor disposed opposite the heater and disposed outboard from the minimum recording medium conveyance span in the orthogonal direction.

12. The conveyance device according to claim 1, wherein the second temperature detector includes a thermistor disposed opposite the heater and disposed in the minimum recording medium conveyance span.

13. The conveyance device according to claim 1, wherein the first temperature detector includes a thermistor disposed opposite the heater and disposed in a maximum recording medium conveyance span where a recording medium having a maximum width in the orthogonal direction is conveyed, the maximum width being available in the conveyance device.

14. The conveyance device according to claim 1, wherein the first detector includes a sensor.

15. The conveyance device according to claim 1, wherein the first rotator includes an endless belt.

16. The conveyance device according to claim 1, wherein the second rotator includes a roller.

17. The conveyance device according to claim 1, wherein a center of the first temperature detector is at a center of the heater in the orthogonal direction.

18. The conveyance device according to claim 1, wherein a distance between the first temperature detector and the second temperature detector is greater than a distance between the first temperature detector and the first detector.

19. The conveyance device according to claim 1, wherein the first temperature detector contacts the heater and the second temperature detector is a non-contact temperature detector separated from the heater.

20. An image forming apparatus comprising:

an image forming device configured to form an image on a recording medium; and a conveyance device configured to convey the recording medium, the conveyance device including:

a first rotator configured to convey the recording medium in a recording medium conveyance direction;

a heater configured to heat the first rotator;

temperature detectors consisting of a first temperature detector configured to detect a temperature of the heater at a first position, and a second temperature detector configured to detect a temperature of the heater at a second position;

a second rotator configured to press against the first rotator, the second rotator including an elastic layer; and a recording medium detector consists of a first detector configured to detect the recording medium, a total number of the first detector being less than a number of the temperature detectors, the first temperature detector being separated from a center position of the elastic layer of the second rotator farther than the second temperature detector is in an orthogonal direction perpendicular to the recording medium conveyance direction, the first temperature detector being separated from the center position for a first length in the orthogonal direction, the first temperature detector being disposed in a first span that is defined by the center position in the orthogonal direction, the first detector being disposed in a second span that is defined by the center position in the orthogonal direction and is opposite to the first span, the first detector being separated from the center position for a second length smaller than the first length in the orthogonal direction, the first detector being disposed in a minimum recording medium conveyance span where the recording medium having a minimum width in the orthogonal direction is conveyed, the minimum width being available in the conveyance device.

* * * * *